US010972411B2

(12) United States Patent
Ioannou et al.

(10) Patent No.: US 10,972,411 B2
(45) Date of Patent: *Apr. 6, 2021

(54) CONDITIONAL AUTOMATIC SOCIAL POSTS

(71) Applicant: Oracle International Corporation, Redwood Shores, CA (US)

(72) Inventors: Andrew Ioannou, San Francisco, CA (US); Eugene W. Trent, II, Oakland, CA (US); Eric L. Sutton, Redwood City, CA (US)

(73) Assignee: Oracle International Corporation, Redwood Shores (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/588,740

(22) Filed: Sep. 30, 2019

(65) Prior Publication Data
US 2020/0036660 A1    Jan. 30, 2020

Related U.S. Application Data

(63) Continuation of application No. 15/418,191, filed on Jan. 27, 2017, now Pat. No. 10,530,714.
(Continued)

(51) Int. Cl.
*H04L 12/58* (2006.01)
*H04L 29/08* (2006.01)
(Continued)

(52) U.S. Cl.
CPC ......... *H04L 51/02* (2013.01); *G06Q 30/0269* (2013.01); *H04L 51/14* (2013.01);
(Continued)

(58) Field of Classification Search
None
See application file for complete search history.

(56) References Cited

U.S. PATENT DOCUMENTS 7,685,575 B1    3/2010  Fareed
8,230,062 B2    7/2012  Newton
(Continued)

OTHER PUBLICATIONS

Case Study: MutualMind, How MutualMind Accelerated the Market Launch of Its Cutting Edge Social Listening, Management and Engagement Solution.
(Continued)

*Primary Examiner* — Dhairya A Patel
(74) *Attorney, Agent, or Firm* — Invoke

(57) ABSTRACT

Techniques are described for triggering conditional automated social posts. According to an embodiment, a set of one or more conditions is received through a user interface by a system executing on one or more computing devices. The system monitors one or more social media channels for target content that has been posted on at least one social media channel of the one or more social media channels. In response to detecting, by the system executing on one or more computing devices, that the target content has been posted on at least one social media channel of the one or more social media channels, the system determines whether the set of one or more conditions are satisfied. In response to determining that the set of one or more conditions are satisfied, the system triggers an action responsive to the target content.

20 Claims, 5 Drawing Sheets

Related U.S. Application Data

(60) Provisional application No. 62/301,584, filed on Feb. 29, 2016.

(51) Int. Cl.
*G06Q 30/02* (2012.01)
*G06Q 50/00* (2012.01)

(52) U.S. Cl.
CPC .............. *H04L 51/32* (2013.01); *H04L 67/22* (2013.01); *G06Q 50/01* (2013.01)

(56) References Cited

U.S. PATENT DOCUMENTS

| | | | |
|---|---|---|---|
| 8,655,938 | B1 | 2/2014 | Smith et al. |
| 8,676,875 | B1 * | 3/2014 | Smith ................ G06Q 30/0256 709/200 |
| 8,712,953 | B2 | 4/2014 | Beringer et al. |
| 8,856,232 | B1 * | 10/2014 | Swerdlow ............. G06Q 50/01 709/204 |
| 9,262,517 | B2 | 2/2016 | Feng et al. |
| 9,330,119 | B2 * | 5/2016 | Chan ...................... G06F 16/22 |
| 9,392,049 | B2 * | 7/2016 | Ennis ...................... H04L 67/10 |
| 9,436,758 | B1 | 9/2016 | Lewis et al. |
| 9,442,984 | B2 | 9/2016 | Smith et al. |
| 9,536,269 | B2 | 1/2017 | Chang et al. |
| 9,633,399 | B2 * | 4/2017 | George .............. G06Q 30/0277 |
| 10,019,988 | B1 | 7/2018 | Chan et al. |
| 10,223,742 | B2 * | 3/2019 | Arora ...................... G06N 20/00 |
| 10,304,081 | B1 * | 5/2019 | Boshy ................ G06Q 30/0246 |
| 10,530,714 | B2 * | 1/2020 | Ioannou ................. H04L 67/10 |
| 2007/0265864 | A1 | 11/2007 | Chess et al. |
| 2009/0106603 | A1 | 4/2009 | Dilman et al. |
| 2009/0319288 | A1 | 12/2009 | Slaney et al. |
| 2012/0046936 | A1 | 2/2012 | Kandekar et al. |
| 2012/0158476 | A1 | 6/2012 | Neystadt et al. |
| 2012/0185735 | A1 | 7/2012 | Sambamurthy et al. |
| 2012/0290562 | A1 * | 11/2012 | Wable ................ G06F 16/9537 707/722 |
| 2012/0296845 | A1 | 11/2012 | Andrews et al. |
| 2013/0073378 | A1 | 3/2013 | Naveh et al. |
| 2013/0166379 | A1 | 6/2013 | Ehindero et al. |
| 2013/0290458 | A1 * | 10/2013 | Morris .................... H04L 51/32 709/206 |
| 2013/0325550 | A1 * | 12/2013 | Varghese ................ H04W 4/21 705/7.31 |
| 2014/0006977 | A1 * | 1/2014 | Adams ................ H04L 12/1818 715/758 |
| 2014/0074551 | A1 | 3/2014 | Setayesh et al. |
| 2014/0074844 | A1 | 3/2014 | Subramanian et al. |
| 2014/0188863 | A1 | 7/2014 | Grauman et al. |
| 2014/0214495 | A1 | 7/2014 | Kutty et al. |
| 2014/0222604 | A1 | 8/2014 | Yellapragada |
| 2014/0280625 | A1 | 9/2014 | Byrd et al. |
| 2015/0020086 | A1 | 1/2015 | Chen et al. |
| 2015/0066788 | A1 | 3/2015 | Tebbe |
| 2015/0169587 | A1 * | 6/2015 | Silverman .......... G06Q 30/0201 707/751 |
| 2016/0004529 | A1 | 1/2016 | Xia et al. |
| 2016/0063442 | A1 | 3/2016 | Bennett et al. |
| 2016/0148325 | A1 * | 5/2016 | Dhawan .................. G06Q 50/01 705/14.66 |
| 2016/0171110 | A1 * | 6/2016 | Gao ....................... H04L 67/306 707/734 |
| 2017/0003137 | A1 * | 1/2017 | Scofield ............. G01C 21/3423 |
| 2017/0053298 | A1 | 2/2017 | Sun et al. |
| 2017/0061528 | A1 | 3/2017 | Arora et al. |
| 2017/0132230 | A1 | 5/2017 | Muralidhar et al. |
| 2017/0366641 | A1 * | 12/2017 | Fultz ....................... H04L 51/36 |
| 2018/0173713 | A1 | 6/2018 | Lawbaugh |

OTHER PUBLICATIONS

Data Collector Overview, http://support.gnip.com/apis/data_collector/overview.html.
Gnip—Data collector, https://gnip.com/realtime/data-collector/, Mar. 18, 2016.
Gomadam et al., Data Enrichment Using Data Sources on the Web, AAAI Technical Report SS-12-04, Intelligent Web Services Meet Social Computing, pp. 34-38.
Guo et al., Linking Tweets to News a Framework to Enrich Short Text Data in Social Media, Proceedings of the 51st Annual Meeting of the Association for Computational Linguistics (vol. 1: Long Papers), Aug. 2013.
Human Data platform DataSift, https://datasiff.eom/plafform/#normalize.
MDM Driven Data Enrichment, IBM InfoSphere Master Data Management, Version 11.3, Mar. 16, 2016, https://www.ibm.eom/support/knowledgecenter/api/content/nl/en-us/SSWSR9_11.3.0/com.ibm.swg.im.mdmhs.sdfcintegration.doc/topics/c_mdmdrivenenrichment.html.
The Value of Social Data, Oracle social white paper, Dec. 2013, http://www.oracle-downloads.com/valueofsocial.pdf.

* cited by examiner

CONDITIONAL AUTOMATIC SOCIAL POSTS

INCORPORATION BY REFERENCE; DISCLAIMER

Each of the following applications are hereby incorporated by reference: application Ser. No. 15/418,191 filed on Jan. 27, 2017; application No. 62/301,584 filed on Feb. 29, 2016. The Applicant hereby rescinds any disclaimer of claim scope in the parent application(s) or the prosecution history thereof and advises the USPTO that the claims in this application may be broader than any claim in the parent application(s).

This application is related to U.S. patent application Ser. No. 15/385,621, entitled "SOCIAL MEDIA ENRICHMENT FRAMEWORK", filed Dec. 20, 2016, the entire contents of which are incorporated by reference as if set forth in their entirety.

FIELD OF THE DISCLOSURE

The present disclosure relates, generally, to social relationship management (SRM) and customer relationship management (CRM) systems and, more specifically, to computer-implemented techniques for monitoring communication channels and performing automated actions associated with responding to detected communications.

BACKGROUND

A growing number of businesses and other entities are using social media platforms to engage with customers and other consumers of goods and services. Social customer service (SCS) personnel may be responsible for creating, promoting, developing, or encouraging positive experiences, which involve leveraging social media platforms to proactively enhance the consumer experience, and/or addressing, resolving, and controlling the exposure of negative experiences, such as resolving consumer problems. Effective SCS interactions with consumers may help improve an organization's brand and image, while ineffective interactions may have little effect or even be damaging. Even outside the context of business, individuals may find themselves encouraging positive social experiences and discouraging negative social experiences in order to enhance their social environments and improve their social images.

Social relationship management (SRM) systems are applications through which organizations may manage SCS interactions with former, current, and future customers. SRM systems typically integrate a variety of components into a unified service to facilitate engagement and management of relationships with consumers over social media channels. Example SRM components may include, without limitation, a social listening component that monitors posts on social media channels (such as Facebook, Twitter, LinkedIn, SnapChat, Periscope, Google Plus, Yelp, WeChat, FourSquare, Instagram, Pinterest, Tumblr, WhatsApp, and/or WordPress, etc.) for relevant content, a social analytic component that analyzes relevant posts detected on social media channels, and a publishing component that allows SRM users ("SRM personnel") to post content on one or multiple social media channels through a single interface. By integrating these components into a single unified service, businesses may quickly react to and provide relevant content through various social media channels.

SRM personnel and social response teams are reluctant to offload tasks onto machines for fear of missing important information. Nevertheless, many SRM personnel and social response teams have incorporated an SRM system into their strategy to help organize, arrange, and highlight relevant social media content when they are otherwise unable to manually read all of the content. Once the social media content is arranged and highlighted in a graphical user interface (GUI), marketing or other SRM personnel may analyze the highlighted data to determine the best way to respond, if any. Using SRM systems in this manner has helped SRM personnel address the most critical content.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
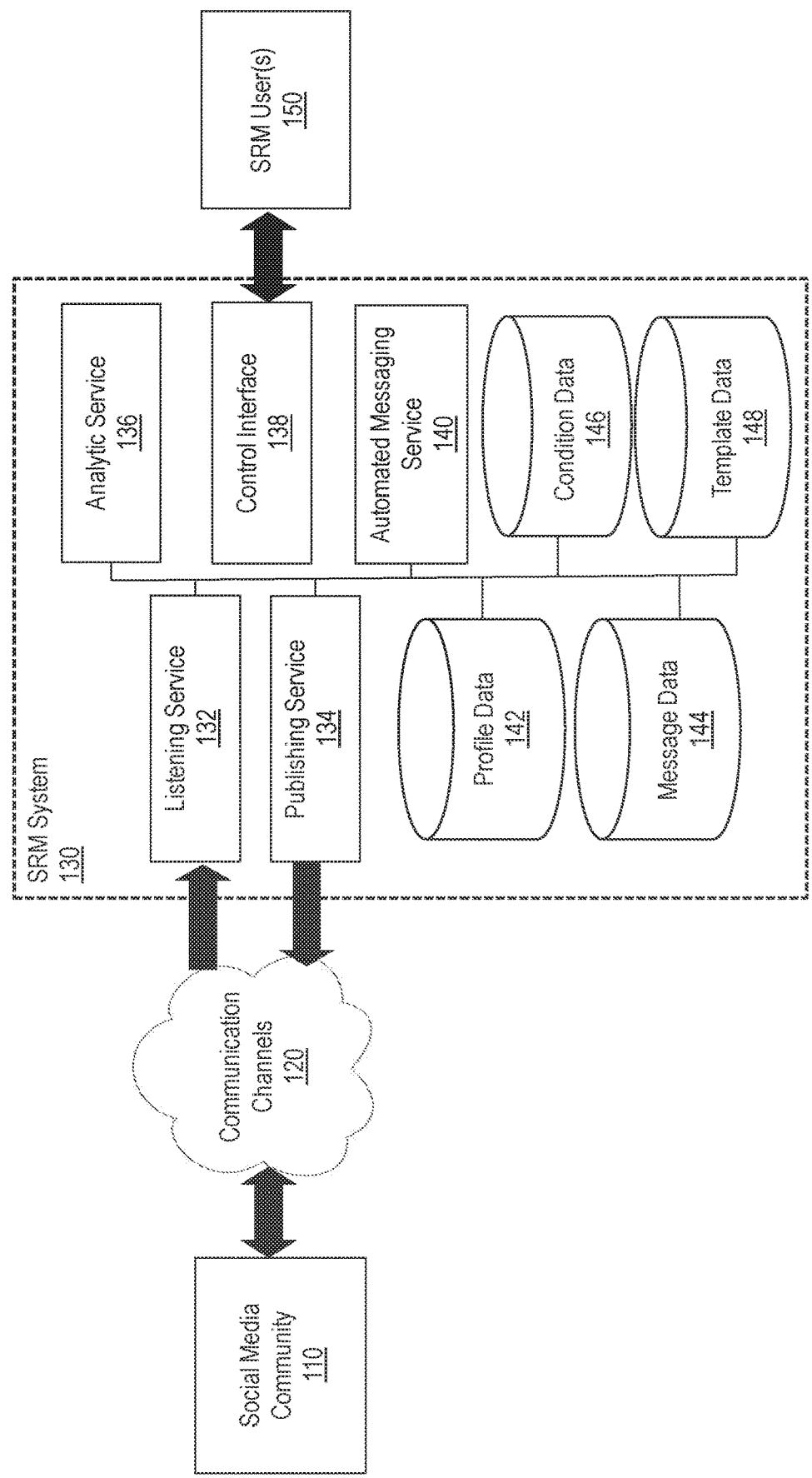
FIG. 1 depicts an example social relationship management system with an integrated automated message component for providing conditional automatic social posts.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In various embodiments, computer systems, stored instructions, and technical steps are described for implementing conditional automatic social posts. A conditional automatic social post in this context refers to one or more messages that are candidates to be posted on one or more social media channels if a set of one or more conditions for triggering posting of the automated message(s) has been satisfied. If the set of one or more conditions is not satisfied, then posting of the automated messages may be delayed until a later time when the set of one or more conditions is satisfied or may be prevented from being posted on social media channel(s) altogether.

The logic for triggering conditional automated messages may be specially tailored for the context in which the automated response(s) is being used. For example, rules and conditions that trigger automated message postings and/or other actions with respect to the posts may differ between separate applications and services. The conditional logic may be exposed to and configurable by an end user, thereby providing flexibility and control over the content, timing, and conditions that cause an automated response message to be posted.

Positive conditions may be specified as triggers or partial triggers. A positive condition as a trigger may cause the posting of a message as long as that posting is not blocked later in the pipeline. The positive condition may be said to have a weight of 1 (on a 0 to 1 scale with 1 being the most significant positive weight) because it is sufficient to cause the post absent other circumstances. A positive condition may also serve as a partial trigger that does not trigger an action on its own but instead triggers an action when satisfied concurrently with one or more other partial triggers. For example, two partial triggers each with a weight of 0.5 may combine (by, for example, summing the weights) to form a weight of 1 that triggers a post. In one or more embodiments, a responsive action may be triggered if and only if at least one positive condition is satisfied.

In some cases, negative conditions may be specified to fully or partially filter, flag, and/or censor an automated or manual message. Negative conditions are different than positive conditions in that negative conditions contribute to preventing an action when the condition is violated rather than contributing to causing an action when the condition is satisfied. Negative conditions allow the user-provided logic to explicitly define filters or other criteria to prevent and reduce the risk of ill-timed or otherwise inappropriate responses from being automatically posted to social media or other communication channels. A negative condition is said to be satisfied if the negative condition does not cause the automated message to be filtered, flagged or otherwise prevented from being posted. For instance, user-provided logic may specify a negative condition to prevent posting of an automated message if a particular event is detected. If the negative condition is violated, then the automated message is not posted. If the negative condition is satisfied (the event is not detected), then the automated message may be posted assuming other conditions, if any, are also satisfied. In one or more embodiments, a responsive action may be triggered if and only if all negative conditions are satisfied.

In an alternative embodiment, a negative condition may contribute a negative weight that, when combined with other negative weights from other violated negative conditions, prevents the posting of an automated message. Full negative conditions may be sufficient to prevent a posting on their own, while partial negative conditions may need to appear in a combination of violated negative conditions in order to prevent the posting of an automated message. In one or more embodiments, if positive conditions and negative conditions are both satisfied with a full weight (for example, −1 on a 0 to −1 scale with −1 being the most significant negative weight), negative conditions overrule positive conditions.

Each set of one or more negative conditions may be stored in association with a set of one or more positive conditions and/or globally with respect to all positive conditions. Similarly, each set of one or more positive conditions may be stored in association with a set of one or more negative conditions or globally with respect to all negative conditions. Conditions, whether positive or negative, may be given a priority so that some overrule or outweigh others. For example, regardless of the positive conditions that are satisfied, a global negative condition with a weight of −1 may prevent any posting when that negative condition is satisfied. Such a negative condition may be: "IF ORIGINATING_POST CONTAINS ANY <LIST_OF_BAD_WORDS>," thereby preventing any response to an originating post that includes any bad words from the list. In the example condition, ORIGINATING_POST refers to a post that triggered any of the positive conditions, CONTAINS refers to an operation that checks whether the post contains content, ANY refers to any of the following satisfying the condition, < . . . > specifies the input to be a list, and LIST_OF_BAD_WORDS is a reference to a list of bad words. In the example, the list may be passed as a reference as shown or literally in quotation marks.

As another example, a particular negative condition may be associated with a first set of positive conditions but not with a second set of positive conditions. The particular negative condition, when violated, may prevent (or contribute to preventing) an automated post triggered by any of the first set of positive conditions but not prevent (or contribute to preventing) an automated post triggered by any of the second set of positive conditions.

SRM systems may integrate conditional automated posts to enhance social interactions in a variety of contexts. In one or more embodiments, SRM systems may trigger conditional automated responses when an organization's personnel are unable to directly address incoming messages due to message volume, personnel unavailability, or other bandwidth restrictions. For instance, an organization may prefer to provide a manual response to a consumer question or concern. However, if nobody within the organization is available to respond to the consumer in a timely manner (i.e., within a threshold period of time), then the SRM system may trigger an automated response. In one example, a global negative condition may be specified that prevents any automated responses when the positive conditions were triggered for the first time within the past 3 hours: "IF ORIGINATING_POST LOGGED_AFTER R(3 "HOURS")". In the example condition, ORIGINATING_POST refers to a post that triggered any of the positive conditions, LOGGED_AFTER refers to an operation that checks whether the post was first logged (i.e., posted or received) on or after a particular time or relative time, R specifies a relative time (alternatively, "A" or no operator could be used for absolute time), and 3 "HOURS" specifies the fresh period of 3 hours, where "HOURS" is the unit of time.

In another example, a negative condition may block an automatic post based on the time of the last automatic post. For example, a negative condition limiting automatic posts to once every 30 minutes may be specified as: "IF AUTOMATED_POST(1) LOGGED_AFTER R(30 "MINUTES")". In the example condition, "AUTOMATED_POST refers to a set of one or more most recent automated posts triggered by the automated post system, (1) indicates that the set should only include the one most recent automated post, LOGGED_AFTER refers to an operation that checks whether the post was first logged on or after a particular time or relative time, R specifies a relative time, and 30 "MINUTES" specifies the wait period of 30 minutes, where "MINUTES" is the unit of time.

Thus, conditional automated posts may be used to increase the efficiency and output of SRM system responses in a manner that provides flexibility in controlling how the SRM system interacts with consumers.

Conditional automatic social posts may be integrated into SCS solutions to expand the scope of services provided to consumers. In one or more embodiments, conditional automatic posts are used to provide social-triggered services where consumers may activate a service by satisfying a set of one or more conditions through social media channels. The conditional post system may be configured to automatically post periodic specifications that explain, to other users socially interacting with a business entity, how to trigger various services offered by that business entity through social channels. For example, the periodic specification may explain that users post "@MYCOMPANY #HOWLONG-ISTHELINE ZIPCODE" to trigger an automated reply from MYCOMPANY that lists the last logged length of the line at the MYCOMPANY retailer(s) in the zip code or closest to the center of the zip code.

Conditional automatic social posts may also be integrated into SCS solutions to more effectively address and resolve consumer problems. As an example, a conditional automatic social post may be set up such that if a widespread problem is detected, a set of one or more public replies is triggered rather than sending a large number of private messages to address the problem. For example, a negative condition associated with a set of positive conditions may be specified that prevents any of the positive conditions from triggering separately if 5 of the positive conditions would be triggered within 2 hours, as: "IF CONDITION_SATISFIED(ALL 5) LOGGED_AFTER R(2 "HOURS")". In the example condition, "POSITIVE_CONDITION_SATISFIED refers to a set of one or more most recent positive conditions satisfied in the associated set of positive conditions triggered by the automated post system, (ALL . . . ) indicates that every item in the set must separately satisfy the condition, ( . . . 5) indicates the last 5 items must satisfy the condition, LOGGED_AFTER refers to an operation that checks whether each condition was first logged as satisfied on or after a particular time or relative time, R specifies a relative time, and 2 "HOUR" specifies the period of 2 hours.

SRM systems may integrate conditional automated social posts into social marketing campaigns to more effectively engage potential consumers. In one or more embodiments, conditional automated social posts may be established to utilize user-generated content (UGC) found in social media channels. For example, the SRM system may search social media channels for content that expresses praise for a particular product, brand, or service provided by an organization and incorporate the UGC into a social post for the organization. UGC may be more effective with certain segments of the market that trust word-of-mouth referrals above other sources. Conditional automated social posts may also be established to select a time to publish relevant marketing content. For instance, marketing messages may be much more effective when timed with the occurrence of certain events. The SRM system may monitor certain events and publish marketing messages based on the outcome of the events. For example, the SRM system may monitor specified RSS feeds, Web sites, services, or social handles that reliably provide factual information about event outcomes, or may monitor a collection of social handles, specified or unspecified, for information in the aggregate about the event outcomes.

In addition or as an alternative to posting automated messages, SRM systems may be configured to perform other automated responsive functions based on detected conditions. Examples may include, without limitation, automatically selecting/recommending a target audience for a candidate post, automatically selecting/recommending a type of social media channel on which to publish the candidate post, automatically selecting/recommending a candidate post from a plurality of candidate posts, automatically performing/recommending an edit to a candidate post, starting/ stopping services, evaluating a quality of a candidate post, evaluating a quality of automated or manual customer service replies, and throttling or otherwise adjusting spending or marketing activities.

SRM System with Automated Message Component

FIG. 1 depicts an example SRM system with an automated messaging component that supports conditional automatic social posts. Referring to FIG. 1, SRM system 130 comprises listening service 132, publishing service 134, analytic service 136, control interface 138, automated messaging service 140, and one or more data repositories. A "service" as used herein refers to a set of one or more processes, threads, or other logic executing on one or more computing devices that provide a certain function or set of functions during execution. In one or more embodiments, the services are integrated into a unified application, cloud or network service. In other embodiments, one or more of the services may be part of a separate application, cloud, or network service.

Listening service 132 monitors communication channels 120 for target content. "Target content" in this context refers to content that is a candidate for triggering a responsive action as described in further detail below. In one or more embodiments, target content includes posts that reference or are otherwise associated with a particular entity, such as an organization, brand, product, or individual. As an example, listening service 132 may be configured to monitor, in real time, for social posts within a threshold period of time that reference a particular brand or product. As another example, listening service 132 may be configured to monitor for recent posts that relate to a particular event or that contain a particular hashtag. As another example, listening service 132 may be configured to search for image or video content that references a particular topic. The target social media content for which social listening service 132 may vary depending on the particular implementation and may be configurable by SRM users 150.

In one or more embodiments, communication channels 120 include one or more social media platforms through which social media community 110 publish social media content. Example social media channels may include, without limitation, blogs, micro-blogs, social networking sites, video sharing websites, photo sharing websites, forums, e-commerce sites that allow users to post company or product reviews or product-specific information, and websites that allow collaborative modification of content. More specific examples of social media channels include Facebook, Twitter, LinkedIn, SnapChat, Periscope, Google Plus, Yelp, WeChat, FourSquare, Instagram, Pinterest, Tumblr, WhatsApp, WordPress, eBay, Amazon Shopping, CraigsList, etc.

In one or more embodiments, communication channels 120 include direct and/or indirect interactions with consumer(s) outside of a social platform. As an example, communication channels 120 may include, without limitation, email communications, direct messages, e-commerce interactions, web marketing interactions, etc. In the context of e-commerce interaction, listening service 132 may monitor interactions associated with a particular target content such as product views, purchase information, and other data provided via HTTP cookies collected from one or more e-commerce sites. In the context of a web marketing platform, listening service 132 may monitor interactions with published web campaigns, such as metrics identifying view-through rates, click-through rates, purchase rates, and/or other campaign data gathered from users interacting with campaign communications for a particular online marketing campaign.

In order to monitor for target content, listening service 132 may crawl, scan, or otherwise search one or more servers for posts, stored cookies, and/or other sources of content. If target content is detected within a communication, listening service 132 may download the communication or otherwise extract the target content from the communication channel and store the communication/target content within one or more data repositories. The communications and target content may be sorted and indexed to facilitate analysis.

Social media community 110 interacts with communication channels 120, including social media platforms, through one or more data communication networks such as the Internet. Social media community 110 may include current, former, and potential future consumers of goods/services provided by an organization that engages in SCS and/or social marketing through SRM system 130.

Publishing service 134 posts or otherwise publishes messages for SRM system 130 on communication channels 120. Publishing service 134 may post messages publicly such that the message is available for viewing to all social media users of a particular social media channel, semi-publicly on a channel that is restricted to a group of users, or privately (e.g., via email or direct message) to a targeted set of users or to a specific user. Published posts may include text, images, audio content, video content, or some combination thereof to convey information to consumers via communication channels 120. Publishing service 134 may publish a post on a single social media channel, across multiple social media channels, via a direct or group email, or through any other network channel.

Analytic service 136 analyzes target content that is found by listening service 132. The analysis that is performed by analytic service 136 may vary depending on the particular implementation and may be configurable by a user. For instance, analytic service 136 may determine whether posts express a positive or negative sentiment toward a particular product or brand. As another example, analytic service 136 may analyze posts to determine trends, such as trends in customer sentiment or trending topics. In yet another example, analytic services 136 may link posts that are related, extract metrics, and/or determine relevance scores as described in further detail below. Analytic service 136 may implement image processing, natural language processing, theme analysis, sound processing and/or one or more other content processing techniques to extract meaning from posted social media content. A user may configure analytic service 136 to monitor for specific conditions within target social media content.

Automated messaging service 140 provides autoreply functionality to set up and publish conditional automated social posts. Automated messaging service 140 may interact with other services, such as listening service 132, publishing service 134, analytic service 136, and control interface 138. Automated messaging service 140 may also be configured to access profile data 142, message data 144, action specification data 146, and/or template data 148. to determine the conditions under which an automated message is posted. In one or more embodiments, automated messaging service 140 may expose an interface, such as an API or GUI, through which a user may set up rules and other conditions for triggering posting of automated messages. Automated messaging service 140 may include a rules engine to process user-provided logic to determine if/when to trigger an automated message or some other automated response. The rules engine may also process user-provided to logic to determine other characteristics of how to generate a conditional social post, such as what content to include in the automated message, on what social media channels to post the automated message, whether to make the post public, semi-public, or private, etc.

Control interface 138 provides a user interface through which SRM user(s) 150 may interact with SRM system 130. SRM user(s) 150 in this context may include human users, such as marketing specialists, system managers, etc., or other applications and services. In one or more embodiments, control interface 138 may expose an API and/or command-line interface (CLI) through which various services, including automated messaging service 140 may be configured. For example, the API may include a set of commands for providing user-defined logic for triggering an automated social post. In addition or as an alternative, control interface 138 may include a GUI through which a user may specify logic for triggering an automated social post. For instance, the GUI may include menus, buttons, and/or other GUI objects that guide a user through a process of providing the user-provided logic to SRM system 130.

SRM system 130 includes one or more data repositories that store profile data 142, message data 144, action specification data 146, and template data 148. Profile data 142 comprises data collected for former, current, and/or potential future consumers. As an example, profile data 142 may include a consumer profile that identifies the consumer's social media handle(s), email address(es), purchase and other transaction history, consumer preferences, consumer habits, etc. Profile data 142 may also store group information that establishes consumer groups based on commonalities among the consumers that belong to the group. For instance, consumers that share a particular brand and/or color preference may be associated with a particular group.

Action specification data 146 stores a set of rules and other conditions used by automated messaging service 140 to trigger automated responses or other actions. As previously indicated, the rules and conditions may be input, changed, and otherwise updated by SRM user(s) 150. Thus, the rules and conditions that are stored may vary from implementation to implementation and may evolve over time based on user input. Example actions and conditions are provided in further detail below.

Template data 148 defines templates to guide a user through various operations for establishing responsive actions. Example templates may include, without limitation, one or more condition templates for specifying positive and/or negative conditions, one or more action specification templates for specifying one or more responsive actions to take, and/or one or more recipe templates to define associations between actions and conditions. When a user selects a template, one or more fields may be displayed through a GUI to receive conditions, actions, and/or recipe definitions. In response to receiving input for the one or more fields via the GUI and based on the one or more fields, one or more action specifications and/or conditions may be generated and stored. The GUI may display an option that allows a user to drill into a labeled box representing a newly generated action specification and/or condition. In response to receiving a selection of the option via a GUI, a textual representation of the action specification(s) and/or condition(s) may be provided. In some cases, textual representation may be hidden from a view that represents the action specification as a labeled box.

Conditions for Automated Social Posts

Automated messaging service 140 includes logic for triggering automated messages and/or other responsive actions when a set of one or more conditions are satisfied. The set of conditions that trigger an action with respect to a candidate post may vary between different candidate posts and may be user-specified, as previously noted. A "candidate post" as used herein may refer to a post including target content that is a candidate for triggering an action or a post that is a candidate to be acted upon by the responsive action. A candidate post that is a cause of triggering a responsive action is also referred to herein as an originating post. A candidate post that is acted upon by a responsive action is also referred to herein as an automated post. Example conditions may include, without limitation:

- Time-based conditions, such as "IF CANDIDATE_POST LOGGED AFTER A (5:00 "PT")" to indicate the condition is effective for posts logged after 5:00 p.m. Pacific Time;
- Consensus-based conditions, such as IF CONSENSUS (CANDIDATE_POSTS) SUPPORTS (0.9) GAMEWINNER (@SanJoseSharks) to indicate the condition is effective when a set of candidate posts supports (e.g., with 90% confidence or some other threshold) the assertion that the Sharks recently won a game;
- Conditions based on the outcome of future facts and events, such as IF FACT(GAME1_Winner) IS "@SanJoseSharks" to indicate the condition is effective when the stored variable GAME1_Winner equals "@SanJoseSharks";
- Conditions based on aggregate data, such as "IF AGGREGATE(CANDIDATE_POSTS) SENTIMENT ">0.5" to indicate the condition is effective if the aggregate of all candidate posts has a positive sentiment greater than 0.5 (on a −1 to 1 scale with 1 being the most positive and −1 being the most negative);
- Location-based conditions, such as "IF CANDIDATE_POST WITHIN 5 "MILES" ZIP ("94065") to indicate the condition is effective if the post is within 5 miles of the center of the 94065 zip code;
- Content-based conditions, such as "IF CANDIDATE_POST CONTAINS ANY <LIST_OF_WORDS>" to indicate the condition is effective if the post contains any of the words in the list;
- Sentiment-based conditions, such as "IF CANDIDATE_POST SENTIMENT ">0.9" to indicate the condition is effective if the candidate post has a positive sentiment greater than 0.9 (on a −1 to 1 scale with 1 being the most positive and −1 being the most negative);
- Predicted controversiality associated with a response, such as "IF CANDIDATE_POST CONTROVERSY ">0.8" to indicate the condition is effective if the candidate post has a controversy value greater than 0.8 (on a 0 to 1 scale with 1 being the most controversial and 0 being the least controversial);
- Tag-based conditions, such as "IF CANDIDATE_POST CONTAINS_TAG "ROCKTHEVOTE" to indicate the condition is effective if the candidate post is tagged with ROCKTHEVOTE, such as by including "#ROCKTHEVOTE";
- Engagement-based conditions, such as "IF CANDIDATE_POST REPOSTED(100)" to indicate the condition is effective if the candidate post is reposted at least 100 times;
- User-based conditions, such as "IF CANDIDATE_POST AUTHOR ANY <LIST_OF_TOP_AUTHORS>" to indicate the condition is effective if the candidate post is by any author from a specified list of top authors;
- Conditions based on intervening manual replies, such as a negative condition: "IF CANDIDATE_POST LOGGED_AFTER R(3 "HOURS") AND NOT CANDIDATE_POST REPLY-AUTHOR ANY <LIST_OF_COMPANY_HANDLES>" to indicate the negative condition is not violated if the candidate post is more than 3 hours old and if the candidate post was not replied to by any author from a specified list of authors or social handles associated with the company; and/or
- A quantified risk factor associated with a response, such as "IF CANDIDATE_REPLY QRISK ">0.5" to indicate the positive conditions do not trigger a candidate autoreply if the quantified risk is greater than 0.5 on a 0 to 1 scale.
- A condition based on the content's signature, such as "IF CANDIDATE_POST SIGNATURE "[ANY <LIST_OF_COMPANY_HANDLES>] is delicious!" to indicate the positive condition is triggered if the candidate post has any handle from a list of company handles followed by the exact text: "is delicious!" Other variables or wildcards may also be added to the signature line, such as "[ANY <LIST_OF_COMPANY_HANDLES>] [W/5] [*"delicious"] to indicate that a company's social handle must occur within 5 characters or words of any word followed by "delicious."

In addition or as an alternative to the above conditions, other user-specified conditions or a combination of conditions may be used to trigger one or more automated social posts. Also, modifying logic such as "ANY," "ALL," "AND," "OR," "NOT," "NOR," "XOR," "ONLY", etc. may be used to modify or clarify conditions. In the absence of such modifying logic, the conditions may carry a default assumption. For example, "IF CANDIDATE_POST ANY REPLY-AUTHOR @CompanyHandle" may omit the word "ANY" before reply-author to have the same effect (i.e., that the condition is satisfied if the author of any reply in the thread is @CompanyHandle). Alternatively, "IF CANDIDATE_POST ALL REPLY-AUTHOR @CompanyHandle" would only be satisfied if all of the replies in the thread are authored by @CompanyHandle, a much less likely scenario.

In one or more embodiments, recipes may be stored as a collection of one or more positive conditions, zero or more negative conditions, and one or more autoreplies. The recipes may carry one or more variables, such as "<LIST_OF_TOP_AUTHORS>" or "<LIST_OF_COMPANY_AUTHORS>" that the user is prompted to fill in, via a GUI, once the recipe is loaded for use. Recipes may be stored by a user once the user finds a desirable configuration of condition(s) and autoreply or autoreplies. Recipes may also be stored by default in the SRM system to spark creativity and promote use among the users. In one or more embodiments, one or more summaries may be displayed, wherein different summaries correspond to different recipes of a set of stored recipes, wherein the set of stored recipes corresponds to a set of stored recipe objects. In response to a selection of a particular recipe corresponding to the recipe object, the one or more conditions and the action specification may be retrieved by the SRM system to activate the recipe.

Once the conditions have been established for a particular conditional post, automated messaging service 140 provides monitoring to determine if the conditions for triggering an action with respect to the conditional post are satisfied. For example, automated messaging service 140 may monitor timing, trends, posted social media content, post metrics, consumer information, risks, and/or intervening replies to determine whether to trigger or filter an automatic social post. As part of the monitoring process, automated messaging service 140 may program, configure, or otherwise utilize listening service 132 to monitor communication channels 120 for target content. Automated messaging service 140 may also program, configure, or otherwise invoke analytic service 136 to monitor for specific social analytics, such as consumer trends and sentiment.

If automated messaging service 140 determines that the certain conditions have been satisfied, then the service may cause an automated message to be posted on one or more of social media channels 120 or take some other sort of responsive action as described further below. Automated messaging service 140 may invoke publishing service 134 to tweet and/or otherwise publish, either publicly or privately, a message on a blog, micro-blog, social networking site, video sharing website, photo sharing website, forum, email, etc.

Figure 2:
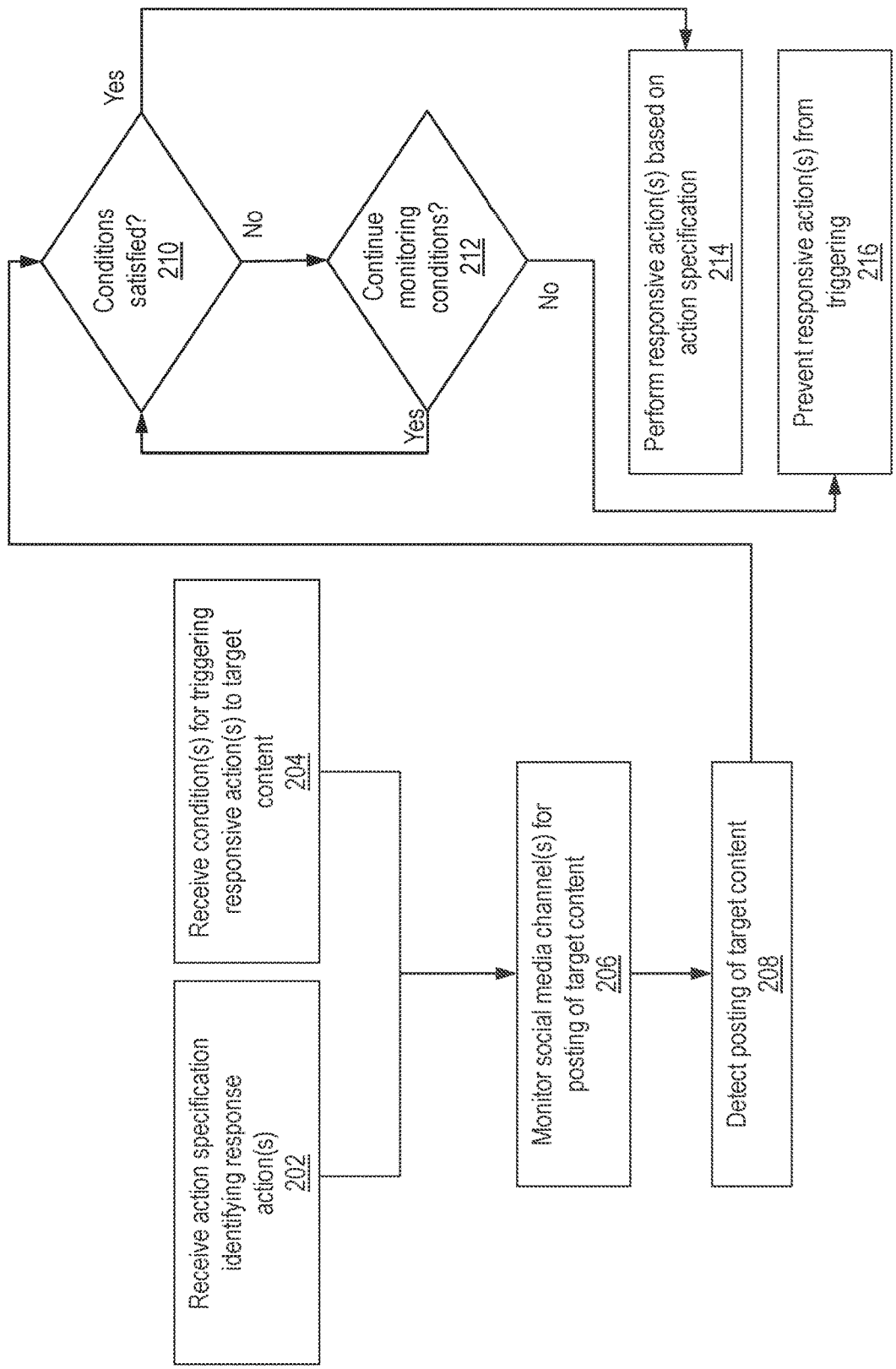
FIG. 2 depicts an example set of operations for determining whether to trigger an automated response to target content detected on one or more communication channels.

In some cases, an automated message may be posted in response to another social media posting (a "reply-to" post) or a group of related postings (a group of "reply-to" posts). Automated messages that are posted responsive to target content herein referred to as "autoreply messages." Rather than instantly replying to target content that is identified, automated messaging service 140 may first determine whether one or more conditions for triggering posting of the autoreply message are satisfied. FIG. 2 depicts an example process for determining whether to trigger an automated response to target content detected on a social media channel.

Referring to FIG. 2, the process receives an action specification identifying one or more responsive actions (Operation 202). The action specification may comprise rules, logic, instructions or other data that serves as a blueprint or executable plan to perform a particular action or set of actions.

In one or more embodiments, the action specification may refer back to default variables or custom variables defined in the triggering condition(s). For example, one action specification may require a CANDIDATE_POST that triggered the action so the action specification may refer back to an author of the candidate post. The action specification could be represented as: "POST(TWITTER, COMPANY_HANDLE) "Thanks [AUTHOR(CANDIDATE_POST)]!" to indicate that the automated message should be posted by COMPANY_HANDLE to Twitter. If the original (candidate) message was by (authored by) @ExcitedCustomer, the message would read "Thanks @ExcitedCustomer!" Note that this action specification might be incompatible with some conditions, for example, if "CANDIDATE_POST" is not used in the triggering condition. On a GUI when a user is defining conditions and actions in an SRM system, the SRM system may display, to the user, candidate action specifications for conditions where incompatible action specifications are filtered out from the view.

Referring again to FIG. 2, the process receives a set of one or more conditions for triggering responsive action to target content (Operation 204). In one or more embodiments, the conditions are specified in user-provided logic or data that maps respective conditions to an action specification that identifies the one or more responsive actions to take if the conditions are satisfied. For example, the action specification may include instructions for posting a set of one or more messages, starting or stopping a service, and/or performing an evaluation. Operation 204 may be performed before, after, or concurrently with operation 202.

Once the action specification and the conditions have been defined, the process monitors communication channels 120 for posting of the target content (Operation 206). For example, social listening service 132 may monitor for target keywords, phrases, image content etc. As another example, analytic service 136 may monitor posts for target trends, commonalities, or other indicators.

In response to monitoring communication channels 120, the process detects one or more communications that include the target content (Operation 208). As an example, the "target content" may correspond to a set of users having a specific set of characteristics ("target users") that have posted communications associated with an organization. Accordingly, the process may detect the target content if the target users have posted messages on a communications channel that include a keyword or phrase referencing the organization. The target content may be detected within one or more social media posts by the target users, communications between the target users and the organization on an e-commerce site, interactions between the target users and online marketing material, etc.

In response to detecting one or more communications that include the target content, the process determines whether the conditions for triggering a responsive action are satisfied (Operation 210). If so, then the process continues to operation 214. Otherwise, the process continues to operation 212

If the conditions for triggering a responsive action are not satisfied, then the process determines whether to continue monitoring the conditions (Operation 212). As an example, monitoring may cease in response to determining that a negative condition has been violated or a timeout value has been reached. If there is still a possibility that the conditions may be subsequently satisfied, then the process may continue monitoring the conditions, returning to operation 210.

If the conditions have been satisfied, then the process triggers a responsive action based on the action specification (Operation 214). For example, the process may trigger a set of one or more autoreply messages, prevent an autoreply message from being posted, or recommend a particular type of communication responsive to the target content. Other examples of responsive actions that may be performed are provided in the examples below.

If it is determined that the conditions are not satisfied and monitoring should stop (e.g., a negative condition has been violated), then the process prevents a responsive action from triggering (Operation 216). For example, the process may flag an autoreply message as inappropriate, censor the autoreply message, or otherwise prevent an autoreply message from being posted in its current state.

The operations depicted in FIG. 2 are not intended to restrict the steps to any particular order. For example, the conditions for triggering the responsive action may be received before the action specification is received, after the action specification is received, during monitoring of the social media channels for posting of target content, or after the target content is detected.

Responsive Actions

As previously indicated, automated messaging service 140 may be configured to perform one or more responsive actions when target content is found on social media channels and the specified conditions are satisfied. Example responsive actions that may be triggered include, without limitation:

Posting an autoreply or some other automated message without any intervening input from a user;

Presenting a suggested candidate post to a human user;

Selecting or recommending a communication channel on which to publish a candidate post;

Selecting or recommending a target audience for a candidate post;

Editing or recommending edits to the content of a candidate post;

Selecting a particular post to publish from a plurality of candidate posts;

Starting or stopping a network service;

Requesting permission for usage rights to UGC in a candidate post;

Initiating a transaction or some other service;

Evaluating the quality of an aggregate set of autoreply or manual messages;

Evaluating the quality of customer responses to an autoreply or manual message;

Boosting or throttling marketing activity and social presence; and/or

Adjusting the rate of autoreply

One or more preventative measures may be taken if a condition for triggering the responsive action has been violated. Example preventive measures may include, without limitation:

Disabling the autoreply functionality or otherwise preventing posting of an automated or manual message;

Warning a user of negative sentiment and/or other detected risk factors associated with posting a message to a target audience;

Removing content from, censoring, or otherwise blocking a part of or an entire automated or manual message;

Ignoring target content/users without responding.

Time-Based Conditions

Automated messaging service 140 may be configured to perform a responsive action based on a set of one or more timing conditions. Time-based conditions may be implemented when an immediate response is not desired by an SRM user. As an example, a social customer service representative may configure an autoreply message to be sent if the service representative cannot address an item within a certain amount of time. This provides the service representative a chance to manually address a customer concern first. If the service representative does not have enough bandwidth to manually address the concern, then the autoreply message may trigger after the threshold amount of time has lapsed.

Timing thresholds may vary depending on the message content, context, engagement, and/or one or more other factors. As an example, autoreply rules may be established to let a message that is not getting views or otherwise has a low level of engagement to persist longer without an autoreply or may prevent an autoreply message from being posted if the level of engagement does not exceed a threshold within a specified time period. On the other hand, the autoreply rules may be configured to provide automatic responses to messages below a threshold level of views or engagement on the theory that lower engagement threads are lower risk. In yet another example, an organization might specify a set of thresholds to trigger an auto-response to an earlier to post having more than a first threshold level of engagement but less than a second threshold level of engagement.

Time-based conditions may also be specified to check for staleness of quickly changing conditions or staleness of past posts. As an example, a time-based condition may specify that an autoreply message should trigger unless a set of one or more target conditions or facts are no longer true. If the target conditions have materially changed, then autoreply may be switched off such that the autoreply message is prevented from being posted.

A time-based condition may be specified using absolute time or relative time. An absolute time may be established by specifying a particular date and time or by specifying a particular amount of time. An automated post may trigger at the specified time if there are no intervening factors that prevent the posting. For example, a customer service representative may set an autoreply message to post if the customer service representative does not address the target content within a threshold number of hours or by a certain time of day. As another example, the customer service representative may set an absolute threshold during which autoreply messages are prevented from being posted. This condition may be useful to prevent messages from being posted between certain hours of the day such as hours when people are unlikely to be awake or hours when customer service representatives are available to address relevant social media content.

Relative time is a time that is specified in relation to a separate event or condition. For example, a customer service representative may set a time threshold relative to the number of views of a particular response or the priority level of the target content. The autoreply message may trigger sooner for higher priority level messages than lower priority messages or vice versa.

In some cases, the timing threshold may be adjusted based on changing conditions. If the priority level of a particular response increases, for instance, then an autoreply to the response may be triggered sooner (or later depending on the particular implementation) than the initially set time for autoreply.

Consensus-Based Conditions

Automated messaging service 140 may be configured to perform or prevent a responsive action based on commonality or consensus among related messages. Related messages may be defined in different ways, depending on the particular implementation. For example, messages may be defined as related if the messages are:

Part of the same reply or comment thread;

Posted on the same social property such as a social networking page that belongs to a particular social media user;

Posted within the same time window;

Posted from the same location or within a threshold distance of each other;

Directed to the same topic;

Share the same sentiment;

Share the same threshold indicators; and/or

Satisfy some combination of the above factors

Consensus or commonality may be determined based on whether a threshold number or percentage of related messages share a target characteristic or set of characteristics. Thus, a determination of whether to trigger a responsive action may be based on a conversation comprising multiple posts rather than a single post.

Consensus-based negative conditions may prevent inappropriate replies in certain contexts such as when there exists contradictory sentiment between related posts. As an example, if a user complains about a product and the complaint is subsequently criticized by many other members of the social media community, it may not be beneficial to address the initial complaint, and an autoreply message may be prevented from being posted. If the consensus shares the same critical sentiment, however, then the autoreply message may be posted to address the initial post or the set of related posts. As another example, a rule may trigger an automated message if a threshold number of related messages share the same sentiment or some other indicator as the automated message.

In one or more embodiments, the SRM system provides, through a GUI, an option to select a discrete plurality of posts and/or threads and/or provide search criteria to identify a changing corpus of posts. The option may be used to define a list of posts that serve as the basis for the consensus-based condition. For example, the option may specify 20 threads to watch, and the consensus-based condition may trigger when any of the 20 threads satisfies sentiment-based and/or engagement-based criteria.

Outcome-Based Conditions

Automated messaging service 140 may be configured to perform a responsive action based on an outcome of a particular fact, trend, or event at a future time. When an automated message is first drafted, the outcome of a future unknown fact, trend, or other event may be useful in formulating an appropriate response. In one or more embodiments, the outcome of an event or some other fact may be automatically determined by monitoring one or more social media posts, RSS feeds, or some other source. As an example, social listening service 132 may monitor social media channels 120 for posts from social media community 110 that indicate whether a particular team won a sporting event or which team won the sporting event. Based on the outcome of the sporting event, automated messaging service 140 may trigger or prevent a set of responsive actions. For instance the posting of a message may be contingent on whether a team wins a sporting event or the content of a message may be based on which team won.

In one or more embodiments, a fact may be updated manually by an SRM user. For instance, an SRM user may specify, through a GUI, future facts or events that are of interest. The same user or a different user may then use a GUI object to identify the outcome of the event at a future time to trigger one or more pre-drafted posts that are dependent on the outcome of the event.

In one or more embodiments, control interface 138 provides a GUI through which SRM user(s) 150 may specify facts/outcomes to monitor and which posts or parts of posts to use under which outcomes. For instance, an SRM user may map a first outcome of an event to a first set of posts and a second outcome for the event to a second set of posts. In response to receiving the input through the GUI, SRM system 130 may generate and store mapping data that maps respective potential outcomes/facts to a respective set of responsive actions and/or preventative measures to be taken. Once the outcome of the event is determined, SRM system 130 may access the mapping data to determine the responsive actions to perform and/or avoid.

In one or more embodiments, facts may be linked together in a series and mapped to a particular responsive action. As an example a tree of facts may be generated with each branch of the tree leading to a separate responsive action. In the context of a sporting event, for instance, different branches may be followed depending on who wins the event. A first branch may be established if a home team shuts out an away team, a second branch if the home team beats but does not shut out the away team, and a third branch if the away team beats the home team. The number of branches and/or facts that are linked together may vary depending on the particular implementation and may be configurable by SRM users 150.

In one embodiment, the mapping is provided by dragging and dropping action specifications to the outputs of a fact-based decision box in a fact-condition-action tree that stores boxes containing facts and/or conditions and/or actions and edges between the boxes. For example, the GAMEWINNER box may have two defined outputs, one for @SanJoseSharks and the other for @ LAKings. If the Sharks win, the SRM system would trigger evaluation of any conditions and/or performance of any action specifications defined below the output of @SanJoseSharks. If the Kings win, the SRM system would trigger evaluation of any conditions and/or performance of any action specifications defined below the output of @LAKings.

An example of using a future event to trigger a response may proceed as follows:
Social listening service 132 detects a message stating "I bet @TeamA will beat @TeamB"
SRM user(s) 150 sets up an automated response to happen if Team A beats Team B
Team A beats Team B;
Automated messaging service determines, based on information extracted from social media channels 120 or input by SRM users 150, that Team A beat Team B; and
An autoreply is posted stating "Nice prediction—check out @serviceXYZ and make some money next time!"

Conditions Based on Aggregation of Messages

Automated messaging service 140 may be configured to perform or prevent a responsive action based on an aggregation of messages. Instead of using the content and context of a single message to trigger an auto response, conditions based on an aggregations of messages may use a more general measure of social activity to trigger a 'response'. For example, a response may be triggered by the occurrence of certain themes being discussed in certain social channels (and/or certain locations/segments/demographics). As another example, a responsive action may be triggered by a trend (e.g., in sentiment, level of engagement, etc.) detected across an aggregation of messages. Analytic services 136 may be configured to perform theme analysis, trend analysis, or look for some other trigger condition among groups of messages. If the trigger condition is detected among the group of messages, automated message service 140 may be notified to take responsive action.

Location-Based Conditions

Automated messaging service 140 may be configured to perform a responsive action based on a location of one or more social media users. For example, a rule may trigger an autoreply to a social media post if a geotag other metadata indicates that the post was made within a threshold distance of a particular location. As another example, a rule may trigger automated messaging service 140 to select a post, from a group of posts, that is within a threshold distance of a particular location and generate an autoreply for the selected post rather than posts outside of that location.

Location-based conditions may also be used to expand the scope of location-based services provided to a consumer. As an example, if a frequent flier tweets a complaint from an airplane, automated messaging service 140 may trigger an automated message to a flight attendant on the flight so that the flight attendant may address the complaint. Alternatively, automated messaging service 140 may filter out or otherwise prevent a manual or automated response to the complaint until the flight has landed. As another example, emergency information may be broadcast to users that are within a certain distance of a particular emergency event.

Content-Based Conditions

Automated messaging service 140 may be configured to perform or prevent a responsive action based on content classification. A given post may be classified in a variety of ways depending on the particular implementation. For instance, a post may be classified as a minor product/service complaint, a severe product/service complaint, praise from a low profile user, praise from a high profile user, a high priority issue, a low priority issue, a reaction to an advertisement, or in some other way based on the content of the post.

Once a post has been classified, automated messaging service 140 may use the classification to determine what responsive action to take, if any, to the particular post. Different autoreply rules may be established for different categories of content. For instance, some categories of content may be prevented from being posted until human approval is obtained. Other categories of content may be automatically posted to social media channels 120 without any intervening human approval. As another example, different autoreplies or autoreply templates may be pre-drafted by a marketing specialist or other SRM user for different types of content. The autoreplies or templates corresponding to the type of content may be used to respond to a future post of that type.

Content-based conditions may account for a success rate of prior posts with similar content or categories of content. For example, it may be determined that cat posts are more successful than dog posts, or vice versa, for a given marketing campaign. If cat posts are more successful, then autoreply messages with content relating to cats may be triggered, and autoreply messages with content relating to dogs may be filtered out and prevented from being posted.

Content-based conditions may account for changes in topics over time. As an example, if a topic on a thread has changed, then autoreply may be disabled to prevent replying out of context. In another example, the autoreply message that is triggered may be selected based on the currently trending topic.

Content-based conditions may be based on the presence of certain images or partial images. For example, a company that has previously shared an image may trigger an automated response to favorite anyone else who shares a similar image. Alternatively, the detection of certain types of images may trigger an automated message to ask a customer for permission to use an image or trademark.

Categories may be manually specified or automatically detected from social marketing posts. In one or more embodiments, analytic service 136 is configured to classify target content. Analytic service 136 may use, theme analysis, clustering, semantic analysis and/or some other classification function to associate a target post with a particular category. The classification may then be stored, accessed, and/or otherwise provided to automated messaging service 140 to determine what responsive action to take, if any.

Sentiment-Based Conditions

Automated messaging service 140 may be configured to perform or prevent a responsive action based on the presence of a positive or negative sentiment. As an example, an organization may wish to prevent autoreplies to positive posts but not to negative posts or vice versa.

Changes in sentiment over time may also be taken into account by automated messaging service 140. As an example, automated messaging service 140 may disable autoreplies if it is determined that a change in sentiment exceeds a threshold level. This may prevent out-of-context replies drafted before the quick change in sentiment was observed.

Sentiment may be determined based, in part, on a semantic analysis of the post. For instance, certain keywords and phrases are commonly used to express a negative sentiment while others are commonly used to express positive sentiment. The analysis may also take into account context to account for posts that use positive words to express a negative sentiment and vice versa, such as in posts that are sarcastic. Analytic service 136 may be configured to perform a semantic analysis of a post to determine the sentiment behind the post. The strength of the sentiment may also factor into the analysis. Organizations may wish to avoid responding to posts where the level of sentiment exceeds a threshold value.

Predicted Controversiality

Automated messaging service 140 may be configured to perform or prevent a responsive action based on the predicted controversiality of a post. For example, it may be controversial to respond to a social media user that has an offensive username or that is associated with a controversial figure. As another example, certain topics or content may be deemed highly controversial and responding to such content may alienate consumers. Automated messaging service 140 may prevent automated messages from being posted if the predicted controversiality exceeds a threshold value.

Tag-Based Conditions

Automated messaging service 140 may be configured to perform or prevent a responsive action based on the presence of one or more hashtags within the target content. As an example, SRM user(s) 150 may input a rule that triggers an autoreply if a set of one or more hashtags are detected. As another example, the rule may prevent an autoreply if a set of one or more hashtags are detected. Tag-based conditions may be used to expose an API for social-triggered services as described in further detail below.

Engagement-Based Conditions

Automated messaging service 140 may be configured to perform or prevent a responsive action based on a level of engagement for a social post. The level of engagement in this context refers to a quantified value indicating how much attention a particular post is receiving. The level of engagement may be determined based on view counts, retweets, shares, responses, likes, dislikes, or some combination thereof.

As previously indicated, a rule may specify a set of one or more thresholds such that different responsive actions are taken based on a comparison of the level of engagement to the set of one or more threshold holds. For instance, a rule may trigger an autoreply to an earlier to post having more than a first threshold level of engagement but less than a second threshold level of engagement. This rule may be implemented to provide automatic responses to posts that have reached a certain level of visibility but posts with the highest level of engagement are left to be addressed by a marketing specialist. The posts with the lowest engagement may be ignored. As another example, an autoreply may be triggered if the target post is above or below a threshold number of retweets, views, or likes.

Conditions Based on User Information

Automated messaging service 140 may be configured to perform or prevent a responsive action based on user information. For example, triggering a responsive action may be based on the level of influence associated with a particular author. The responsive action triggered for high-level influencers, defined as authors driving a high level of engagement on social media channels, may be different than responsive actions taken for mid-level or low-level influencers. As another example, the responsive action that is triggered may depend on the number of users following the author, the author's preferences, the success of prior replies to the author, purchasing history of the author, what social communities the author is affiliated with, or other user profile data.

In one or more embodiments, profile data 142 maintains a mapping of a user's social media handles and information about the user. When a target post is detected, automated messaging service 140 may obtain information about the author from profile data 142. In other embodiments, automated messaging service 140 may extract information about the author from the social media channel on which the author posted. In yet another embodiment, automated messaging service 140 may obtain information about the user from a marketing cloud service that collects, organizes, and stores consumer data.

Conditions Based on Demographics

Automated messaging service 140 may be configured to perform or prevent a responsive action based on demographic information. As an example, certain autoreply messages may be directed to a target demographic. If it is determined that an autoreply message is not likely to reach the target demographic, then automated messaging service 140 may be disabled.

In one or more embodiments, demographic information may be retrieved from a marketing cloud service. As previously indicated, certain marketing cloud services operate as cloud-based big data platforms that collect, organize, and store consumer data. An example approach is for the marketing cloud service to collect profile data from companies that share the information and/or to gather information from cookies embedded in e-commerce or other sites. The marketing cloud service aggregates various identifiers and associated demographic information in a manner that preserves the privacy rights of the individuals being monitored. SRM system 130 may provide the social identifier of an author to the marketing cloud service. In response, the marketing cloud service matches the social identifier to the corresponding demographic information, which may then be returned and used by automated messaging service 140 to determine how to respond to a target post.

Conditions Based on Intervening Replies

Automated messaging service 140 may be configured to perform or prevent a responsive action based on the presence or absence of intervening replies. If a human marketing representative has already replied to a post, then the autoreply logic may prevent a subsequent autoreply. Alternatively, the type of autoreply triggered may vary based on the type of intervening replies that were previously posted. For instance, a manual or automatic reply that states "We will get back to you" may be followed up with an autoreply of "We are still working on this—stay tuned!" or some other message.

Risk-Based Conditions

An automated message may be triggered or disabled based on a quantified risk factor. A quantified risk factor in this context refers to a value that measures the risks associated with posting an out-of-context or otherwise inappropriate reply. The quantified risk factor may be used to determine whether the autoreply logic triggers at all, whether the autoreply logic waits for human approval of a draft message before being published, or whether the autoreply logic publishes the draft without human approval. As an example, if the risk exceeds a threshold, then the autoreply logic may be disabled or may present the draft to a human user for review. If below a threshold, then the message may be posted without intervening manual review.

The risk factor may be quantified based on one or more other factors, which may vary from implementation to implementation. Example factors that may influence the risk may include, without limitation, sentiment, popularity, the value or magnitude of an associated customer accounts, the predicted controversiality, or some combination thereof. For instance, a classification of the author of the target content may determine which type of autoreply is available for that user. Autoreplies may be turned off for a high-priority customer to completely eliminate the risk of an inappropriate automated response to that customer.

Signature-Based Conditions

Automated messaging service 140 may be configured to perform or prevent a responsive action based on a signature associated with target content. A signature allows for variables, wildcards, and distance-based operators to be embedded within a content search. For example, a signature could account for a variable list of handles, a specified distance between words, wildcard placeholders, specific words, etc. In one or more embodiments, the signature and/or some operators within the signature strictly enforce ordering. For example, if "coffee" appears before "delicious" in the signature, then it must appear before delicious in a post in order to match the signature. In another embodiment, the signature and/or some operators within the signature allow for ordering to be swapped. For example, an operator may allow "delicious" to appear before "coffee" and match the signature even if the operator is specified as "coffee [W/5] delicious".

Metric Tracking Based on Specified Conditions

In one or more embodiments, analytic service 136 extracts metrics for one or more of the conditions described above. A "metric" in this context is a value that provides a measure for an associated condition that is detected on one or more communication channels. Metrics may be tracked for one or more targets, depending on the conditions that are defined for a set of candidate posts. A target in this context may be a user, a group of users, a candidate post, a keyword, a topic, or some combination thereof.

Example metrics may include, without limitation:
- Sentiment-based metrics that indicate a level of sentiment detected with respect to a target. For example, a metric may indicate a level of sentiment detected with respect to a particular keyword or topic. The metric may be selected from a range of 1 to 10, where 10 indicates a positive sentiment, 5 indicates a neutral sentiment, and 1 indicates a negative sentiment. Any other range of values may also be used to measure sentiment, depending on the particular implementation.
- Engagement-based metrics that indicate a level of engagement detected with respect to a particular target. Example engagement-based metrics may include, without limitation view counts, retweets, shares, responses, likes, dislikes, or some combination thereof. Similar to sentiment-based metrics, a value may be selected from a range to indicate a relative level of engagement on a normalized scale.
- Location-based metrics that identify or indicate a location associated with a target. For examples, a location-based metric may indicate a distance from a venue, a location from which a post-originated, an approximate location of a user, etc.
- Risk-based metrics that quantify a risk associated with a target. For example, a metric may quantify a risk associated with publishing a post with a particular keyword, sending the post to a particular user or group of users, making the post public, publishing the post on a particular communication channel, etc.
- Controversiality-based metrics that indicate a predicted level of controversy associated with a target. For example, a controversiality-based metric may be selected from a range of values, where one end of the spectrum indicates a high likelihood of controversy and a lower end of the spectrum indicates a zero or near-zero likelihood of controversy. The value may be derived based on measured reactions and/or predefined values for particular keywords, topic, user, group of users, etc.
- User-based metrics that track characteristics that are associated with a particular user or group of users. For example, a metric may indicate a level of influence that a user has, a purchase history associated with a user, click-through information about the user, etc.
- Consensus-based metrics that measure a level of consensus around a particular target. For example, a consensus value of 1 may indicate that 100% of participants within a thread agree with an original poster/author whereas a consensus value of 0 may indicate that 0% of participants agree.
- Outcome-based metrics that measure a result of a target event. For example, an outcome-based metric may comprise a score of a game, a result of an election, etc.
- Time-based metrics that track timing information associated with a target. For example, a time-based metric may track the occurrence of an event, the recency of a post, etc.

In one or more embodiments, the metric values are updated based on monitored communications along communication channels 120. For instance, if a first communication including target content is detected, then one or more metrics may be updated based on an analysis of the first communication. As an example, analytic service 136 determines a positive sentiment associated with a particular keyword based on the first communication, a corresponding sentiment-based metric may be updated by increasing a value associated with the keyword that measures sentiment. If a second communication that includes target content is detected, then analytic service 136 may analyze the conditions associated with the second communication an update the metrics accordingly. For instance, if the second communication indicates a negative sentiment associated with the keyword, then the sentiment metric may be decreased. Other metrics associated with the first communication and/or second communication may be updated, such as engagement-based metrics, locations-based metrics, etc. Thus, the metrics may evolve over time based on the communications detected over communication channels 120.

Keyword Associations and Tracking

In one or more embodiments, SRM system 130 maintains a set of keyword tuples that associate keywords with one or more metric values. For example, an n-tuple data object, represented as {KEYWORD(S), METRIC 1, . . . , METRIC N} may associate a set of one or more keywords "KEYWORD(S)" with one or more metrics measuring any of the conditions previously described. Thus, a keyword or phrase may be mapped to various metrics such as a level of sentiment, engagement, risk, etc.

The keywords and metrics that are tracked may be specified by a user or automatically selected. For instance, a user may specify a set of keywords and metrics that are of interest. In response, a keyword tuple may be generated, and the metrics of interest may be tracked for the specified keyword. In addition or alternatively, the keywords may be selected based on monitored conditions among the communication channels. For example, SRM system 130 may monitor for high levels of engagement, negative sentiment, and/or other conditions among the channels. SRM system 130 may then extrapolate patterns based on the monitored conditions and extract keywords that are associated with certain target conditions (e.g., negative sentiment, high levels of engagement, high levels of risk, etc.).

SRM system 130 may continually monitor one or more of communication channels 120 to update keyword metrics. For instance, if the keyword "Troubleshooting" is of interest, then listening service 132 may be configured to identify social media posts on target social media channels that include the keyword. If the keyword is detected, then analytic service 136 may extract metrics associated with the social media post that included the keyword. If a tuple for "Troubleshooting" does not exist, then analytic service 136 may generate a new tuple for the keyword that maps the keyword to the metrics of interest extracted from the social media post. If a tuple already exists, then the keyword metrics within the existing tuple may be updated based on the current post that is being analyzed.

In one or more embodiments, SRM system 130 may analyze keyword tuples to determine whether to trigger or prevent a responsive action. For example, analytic service 136 may parse the text of a candidate post to identify keywords included in the post. Analytic service 136 may then determine the metrics associated with one or more of these keywords, such as the level of sentiment, engagement, and risk that are associated with the corresponding keyword. Based on the metrics tracked for the keywords of interest, analytic service 136 may perform or prevent one or more of the responsive actions previously described with respect to the candidate post. For example, analytic service 136 may prevent a post from being submitted if it includes a keyword that is mapped to a negative sentiment value. Analytic service 136 may recommend alternative keywords based on which keywords have been mapped to positive sentiment, high-levels of engagement, and low levels of risk.

In one or more embodiments, SRM system 130 maintains different sets of keyword tuples for different users and/or different groups of users. For example, a first set of tuples may map keywords to metrics for one group of users (e.g., users that reside in a particular location and/or that share some other attribute) while a second set of tuples may map keywords to metrics for a different group of users (e.g., users that reside in a different location). This allows analytic service 136 to detect different trends in metrics among different respective users or groups of users. For instance, the keyword "San Jose Sharks" may be associated with a positive sentiment for candidate recipients that live in or around San Jose but garner negative sentiment for candidate recipients that reside in Southern California. Analytic service 136 may determine what responsive actions to perform with respect to a candidate post that includes the keyword "San Jose Sharks" based on the different tuple sets. In the present example, the candidate post may be broadcast to a group of users that have a positive association with the keyword and prevent the message from being sent to users that have a negative association with the keyword. Analytic service 136 may implement any other conditional logic using the keyword-to-metric mappings to select responsive actions that are more likely to be effective with respect to a candidate post.

Data Aggregation Across Multiple Communication Channels

In one or more embodiments, analytic service 136 comprises a data aggregation engine that collects target content from different communication channels and identifies relationships between the target content. Data from different communication channels may be related in a variety of ways. For example, two posts may reference the same keyword or set of keywords that are of interest. In this scenario, it may be useful to aggregate metrics associated with the two posts to determine an aggregate level of sentiment, engagement, and/or some other metric for the set of keywords. For instance, the data aggregation engine may extract a set of metrics from a post to a Facebook channel in response to detecting that the post includes a particular keyword. The data aggregation engine may also extract another set of metrics associated with a tweet that includes the same keyword. The data aggregation engine may then combine the metrics across the different channels to gauge the impact and effectiveness of using keywords with target audiences. SRM system 130 may maintain the combined metrics for a given keyword in a keyword tuple as previously described.

In another example, the data aggregation engine may combine user characteristics associated with communications that originate from the same author or that have been posted on different channels for native entities under common control. As an example, analytic service 136 may detect a particular post of interest with respect to one native entity (e.g., a Twitter account) and extract a set of metrics and/or other characteristics about the native entity from the post. Analytic service 136 may subsequently detect a different post of interest on a different social media account/native entity (e.g., an Instagram account) that is controlled by the same person, enterprise, or organization. Analytic service 136 may then extract a different set of characteristics about the native entity. The data aggregation engine may then combine the user characteristics extracted from the different sources to generate a more detailed profile of the user.

In one or more embodiments, metrics and/or other characteristics that are determined for a target entity may be probabilistic in nature. A "virtual" or "probabilistic characteristic" in this context is a metric or attribute that is associated with a level of uncertainty. Probabilistic characteristics are useful in implementations where aggregating data from different sources involves some uncertainty. As an example, e-commerce and marketing platforms often maintain strict privacy standards to protect the security of personally-identifying information. These platforms may allow queries on group trends, such as trends exhibited by a certain demographics of individuals, but prevent queries on individual user information. In this scenario, analytic service 136 may submit queries to the platform to identify virtual characteristics that may not have a 100% level of certainty. For instance, analytic service 136 may be prevented from determining the specific purchase history of a user of interest (the "target entity"), but may determine from the e-commerce platform that 75% of individuals residing in a particular zip code location have a positive sentiment with respect to a certain product. Based on this data, analytic service 136 may assign a virtual characteristic to a target entity that resides within the zip code location that indicates that the target entity has a positive sentiment associated with the particular product. The virtual characteristic may also be associated with a probabilistic score indicating that there is a 75% chance that the virtual characteristic applies to the target entity. As another example, a marketing platform may maintain click-through statistics that map click-throughs to machine identifiers (e.g., host/IP address). On a public computer, there may be a relatively low probability that a click-through data applies to a particular user as many different people may use the machine throughout the course of a day. By contrast, click-through statistics may have a much higher chance of being associated with a user on a private computer where only a few users have access.

Uncertainty may also stem from other sources, depending on the particular implementation. For example, recency of the data may also factor into the uncertainty of a characteristic. A recent post originating from a particular location generally correlates to a high probability that the author is at that location. As time goes by, however, the probability that the user is still at that location decreases. Similarly, other user-specific characteristics such as residence, occupation, etc. may also change over time. As another example, the confidence in the measurement accuracy of a metric may be subject to uncertainty. For instance, an analytical model that computes a level of sentiment may not have 100% confidence in the computed value. The confidence in accuracy of the metric may depend on the source of the metric (e.g., the analytical model used) as well as the metric itself. As described further below, the data aggregation may account for such uncertainties when aggregating data from different sources.

In one or more embodiments, the data aggregation engine assigns relevance scores to metrics and/or other characteristics collected from communication channels 120. A relevance score in this context represents a likelihood that the metric/characteristic is relevant to a target, where a target may correspond to a user, a group of users, or a candidate post. For instance, a relevance score of 1 (on a scale of 0 to 1) may indicate that a metric is highly relevant to a target. On the other hand, a relevance score of 0 may indicate that a metric is completely irrelevant to a target.

In addition or alternatively, the relevance score may be computed based on a confidence that a metric or another characteristic was accurately measured (or classified). For instance, a confidence of 1 (on a scale of 0 to 1) may indicate that there is no uncertainty in the metric's accuracy. By contract, a confidence of 0.5 may indicate a 50% likelihood that the metric is accurate. Confidence differs from the probability value described above in that the accuracy of the metric may be completely independent of the probability that it is applicable to a user. The data engine may have 100% confidence that a virtual characteristic was accurately measured, but only be 50% certain that the virtual characteristic is applicable to a user. Conversely, the data engine may be only 50% confident that a measurement is accurate, but be 100% certain the metric represents a user-specific characteristic.

In addition or alternatively, the relevance score may be computed based on a temporal weight given to a virtual characteristic. In one or more embodiments, the temporal weight is determined based on timestamps. When a metric is initially detected, a timestamp may be assigned to the metric. In some cases, the timestamp may be determined based on the time of the communication from which the metric was extracted. In other cases, the timestamp may correspond to the time the metric was extracted. A recency model may then assign a temporal weight using the timestamp. For instance, a weight of 1 (on a scale of 0 to 1) may be assigned if the timestamp indicates that the metric was measured recently (e.g., within a day or some other threshold). The weight may decay over time linearly, exponentially, or according to any other model. Different metrics may decay at different rates. For example, a characteristic capturing the current location of a user may decay much more rapidly than a characteristic capturing a mailing address as the user is much more likely to change the current location frequently.

In addition or alternatively, the relevance score may be computed based on channel weightings. Data collected from one communication channel may be given a greater weight than data on another channel. The weights may be assigned based on the reliability of the communication channel, the level of engagement observed on the channel, and/or any other channel attributes. For example, a weight of 1 (on a scale of 0 to 1) may be assigned to channels that are considered reliable sources of information while less reliable sources may be weighted closer to 0.

In one or more embodiments, the relevance score is computed based on a combination of the probability, confidence, temporal weight and/or channel weight described above. For example, the relevance score may be computed by averaging, summing, or multiplying the values together. If multiplying, for instance, a combined relevance score of "1" may indicate a strong relevance, whereas a combined score of "0" indicates zero or very little relevance. Any other scale and aggregation function may be used to compute a relevance score that represents an overall relevance or effectiveness of a characteristic with respect to a particular target. In other embodiments, the relevance score may be the same as a probability score, confidence score, temporal weight, or the channel weight determine for the metric.

In one or more embodiments, metrics from different sources are linked together based on hashed user identifiers. For example, the data processing engine may apply a hash function to a user's email address, social media account handle, or some other identifier. Metrics and other characteristics may then be mapped within a hash table to the corresponding hash value. The relevance score may take into account the likelihood that the metrics are associated with the same native entity. For instance, there may be a level of uncertainty that metrics aggregated from a tweet and Facebook post originated from the same native entity. The channel weight described above may be adjusted based on the uncertainty that the two authors or native entities are the same person.

In one or more embodiments, relevance scores are factored into the conditions for triggering responsive actions with respect to a candidate post. For example, a condition may specify that "IF TARGET_RECIPIENT WITHIN 5 "MILES" ZIP("94065") PROBABILITY>0.9" to indicate the condition is effective if the target recipient is within 5 miles of the center of the 94065 zip code with a probability score of more than 0.9. Similarly, relevance score may be incorporated into any of the other conditions specified above to control whether or not a responsive action is performed. In some scenarios, a user may want a high degree of certainty in the metrics and their relevance to a target audience before the post is published. For less sensitive posts, the relevance score may be ignored.

Figure 3:
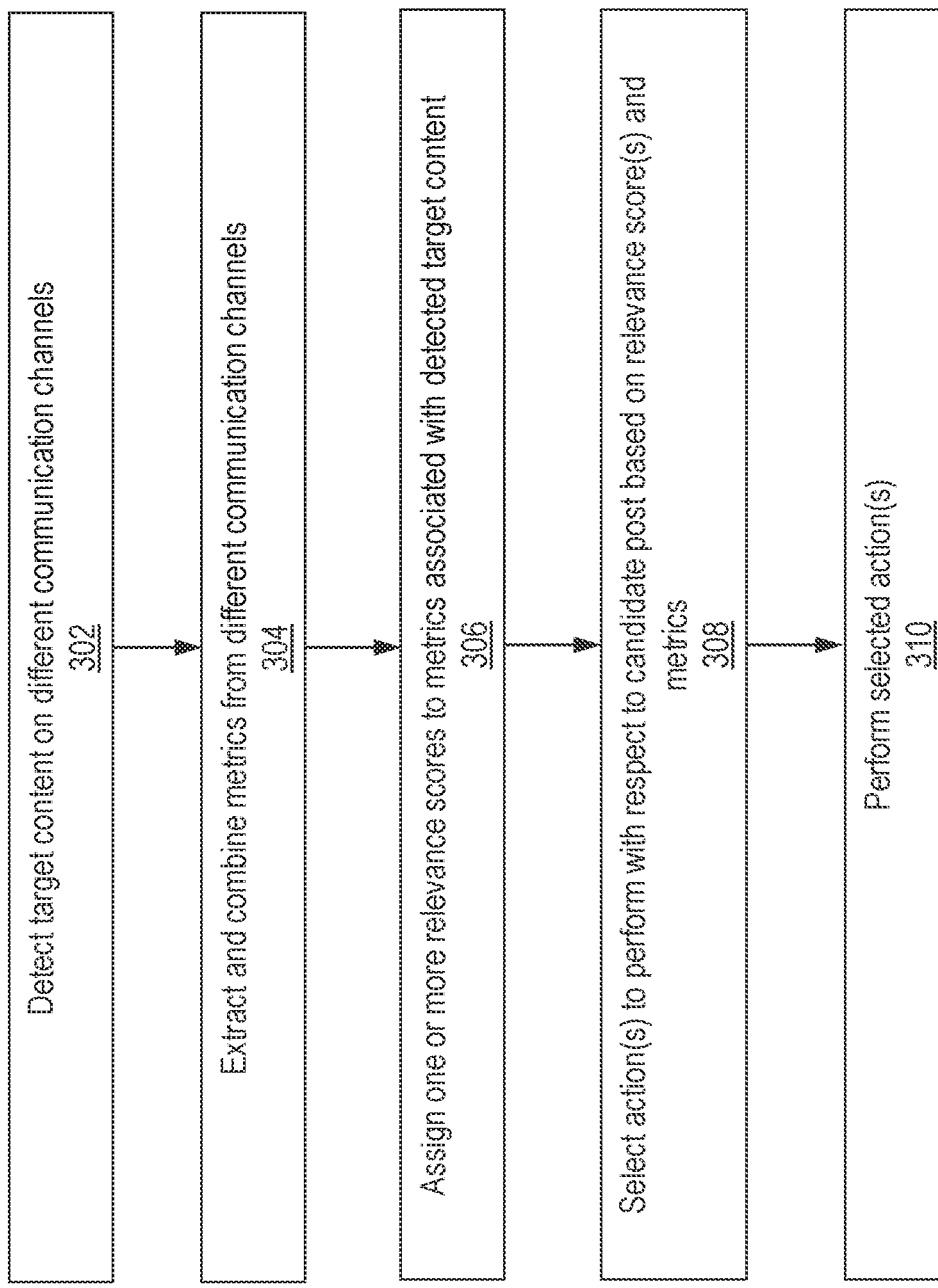
FIG. 3 depicts an example set of operations for analyzing data originating a plurality of communication channels in order to determine whether to perform an action with respect to a candidate post in accordance with one or more embodiments.

FIG. 3 depicts an example set of operations for analyzing data originating a plurality of communication channels in order to determine whether to perform an action with respect to a candidate post in accordance with one or more embodiments. The process includes detecting target content on a plurality of different communication channel (Operation 302). For example, listening service 132 may be configured to monitor communication channels 120 for posts that reference certain keywords or phrases, relate to certain topics, are associated with a particular user, or otherwise satisfy a set of content-specific criteria. During monitoring, listening service 132 may detect a post on a first social media channel that satisfies the content-specific criteria. Additional content may be detected within one or more subsequent posts on other social media channels. In addition or alternatively, content may be exported from an e-commerce and/or marketing platform.

The process further includes extracting a set of metrics associated with the content from different communication channels (Operation 304). The metrics may comprise any of the characteristics previously described. The metrics that are extracted may vary from source to source. For instance, metrics extracted from a most recent post may include a current location of a user. The process may extract other user characteristics from a different source. As previously mentioned, metrics from different sources may be linked using hashed user identifiers according to one or more embodiments. In other embodiments, an analytic may be employed to determine which metrics are related. The analytic may consider the amount of user information that matches (e.g., the more that matches, the higher the likelihood that it is the same entity), and may give certain characteristics greater weight (e.g., a physical or email address that matches may be given greater weight than a name that matches).

Once extracted, the process assigns one or more relevance scores to the set of metrics (Operation 306). The relevance score or set of relevance scores computed during this operation reflect a likelihood that the metric is relevant to a particular target. A "target" in this context may be a candidate recipient (or group of recipients) of a candidate post, a candidate communication channel over which a candidate post may be communicated, or the candidate post itself. The relevance scores may account for a probability that the metric is applicable to the target, a confidence in the accuracy of the metric, a channel weight, and/or a temporal weight as previously described.

Based on the set of metrics and one or more relevance scores, the process selects one or more actions to perform with respect to a candidate post (Operation 308). In one or more embodiments, an automated responsive action may be selected using a set of one or more stored heuristics. A stored heuristic in this context may include, without limitation, stored rule(s) or condition(s), such any combination of rules or conditions previously described. For instance, a heuristic may select and/or trigger an action if the relevance score satisfies a particular threshold. A different action may be performed (or the action may be prevented) if the relevance score does not satisfy the threshold. As another example, a keyword tuple for a particular target recipient may indicate that the user has a positive sentiment with the keyword "cat" with a "0.9" confidence score (which may be used as the relevance score in this context). By contrast, the user may have a positive sentiment with the keyword "dog" with a "0.5" confidence score. Based on these metrics and relevance scores, a stored heuristic may cause the process to select a candidate post referencing cats rather than a candidate post referencing dogs to post to the user. Other actions that may be performed with respect to a candidate post may include, but are not limited to, selecting a target audience for receiving a candidate post (e.g., an audience for which the post is most relevant), selecting a communication channel over which to publish the post (e.g., a channel with the highest level of engagement), and any other of the responsive actions previously described. A stored heuristic may combine multiple conditions for triggering a responsive action using one or more operations such as previously described.

Once selected, the process performs the selected one or more actions with respect to the candidate post (Operation 310). For instance, the process may automatically publish the post, generate recommendations and warnings with respect to the candidate post, choose a post from a set of possible posts, and/or perform any of the other actions previously described.

Triggering Auto-Suggested Responses and Warnings

Triggering a candidate autoreply message may involve automatically posting the message without intervening review or may involve presenting a suggested response to human user for review. For instance, the auto-response rules may find messages, based on one or more conditions described above, to respond to and generate the suggested response. The response may then be passed to an SRM user to be reviewed and/or edited before being posted. Suggested posts may be approved as-is, modified before posting, or rejected altogether. This allows a higher throughput of responses while providing humans users with the opportunity to filter or improve the quality of a response.

In one or more embodiments, a warning message/recommendation may be triggered for a particular post based on one or more detected risk factors. For example, a warning may be generated if the target audience for a candidate post includes a user with a high level of influence on social media channels. If the candidate post is querying the level of consumer satisfaction, and the high-level influencer responds negatively, the response may negatively impact the organization. In order to prevent this risk, a warning may be presented indicating that the target audience includes a high-level influencer and recommend cancelling the message or sending the message privately.

The level of risk for one candidate post may vary from the level of risk of another candidate post based on the content included within the candidate post. For instance, the risk of posting a greeting or Happy Birthday message may be much less than the risk of sending queries to a target audience. In the latter scenario, a damaging response may be much more likely. In order to account for this difference, the threshold levels of risk for different candidate posts may be set differently. For instance, a thank you message may require a much higher level of negative sentiment to be detected than a query before preventative measures are triggered.

Autoreply Content Generation

The manner in which an autoreply message is drafted may vary from implementation to implementation. Content within the autoreply message may originate from one or more of the following sources:
  Content generated or otherwise provided by a human user drafting the message;
  Content automatically generated based on user-provided logic; and/or
  Content obtained from social media users that are not involved in drafting the message.

In one or more embodiments, autoreply messages are manually drafted to respond to target content. A marketing specialist or other SRM user may draft the message either before or after the target content is detected. As an example, the marketing specialist may draft an ahead-of-time response that may be applied to an automatically selected message that is subsequently posted. A manually drafted post may be prevented from being posted if the conditions for posting it are not satisfied.

The content of an automatically drafted autoreply messages may be based on a set of one or more factors. Example factors may include, without limitation:
  Content within a target post selected for reply: Content from a reply-to post may be incorporated into the autoreply message. As an example, an autoreply message may be drafted automatically to reference a word, phrase a hashtag, image, or video included in the target post. Content external to the reply-to post may be included or excluded based on the content detected within the reply-to post.
  Metadata information about the target post: Autoreply messages may be drafted to reference or respond to metadata information associated with the target post. For example, the autoreply message may reference a location determined from a metadata tag associated with the target post.
  Information external to the target post. Autoreply messages may be drafted automatically to reference or respond to information obtained from sources external from the target post. In one or more embodiments, an autoreply message may reference information associated with an author obtained from external sources to tailor the message. For instance, customer profile data may be accessed to determine what sports teams, products, and/or services the author likes. The automated message may be drafted to reference this data. As another example, determining whether an author has a history with an organization may affect whether a response or autoreply message is sent at all. In yet another example, SRM system 130 may measure the overall negativity, sensitively, and/or influence of an author to tailor the autoreply or block a message from being sent. The autoreply logic may allow for SRM users to manually label an author such that the author does not receive autoreplies in the future.

User-generated content may also be incorporated into an automatic of manually drafted post. Social listening service 132 may be configured to search for target user-generated content to include in marketing or other messages. If relevant user-generated content is found, automated messaging service may trigger a message to the owner of the content to request permission to use it. If approved, automated messaging service may incorporate the content into a message template or may otherwise present the content to a marketing specialist for review.

In one embodiment, a mapping is provided by dragging and dropping action specifications to the outputs of a fact-based decision box in a fact-condition-action tree that stores boxes containing facts and/or conditions and/or actions and edges between the boxes. In one embodiment, an action specification may refer back to default variables or custom variables defined in the triggering condition(s) that are connected to the action specification in the tree. For example, one action specification may require a <LIST_OF_CANDIDATE_POSTS> that triggered the action so the action specification may refer back to a most recent post in the list. The action specification could be represented as: "POST(FACEBOOK, COMPANY_HANDLE) REPLY_TO (LIST_OF_CANDIDATE_POSTS ("ROOT")) "We think the Gatorade helped!" to indicate that the automated message should be a reply to the first or root item in the list of candidate posts that led to triggering the action specification. If the original (candidate) thread was started by ExcitedFan with the message "What a dunk!", the message would read, in reply to ExcitedFan, "We think the Gatorade helped!" In the tree on a GUI, the SRM system may prevent a user from dragging an action specification to an incompatible condition (such as, in the example above, where the condition is not based on a list of candidate posts). For example, the tree may gray out the incompatible conditions when a user attempts to drag an action specification onto the tree.

Obtaining Permission to Use Content

Obtaining permission to integrate user-generated content into marketing and other material may be a time-consuming task if performed manually. On the other hand, sending permission may be seen as intrusive or "cold" if an automated message is triggered every time potential user-generated content of interest is detected. To prevent this from happening, a combination of one or more of the conditions described above may be used to control the timing and content of the automated requests for permission. As an example, an autoreply rule may be defined such that the request for permission is triggered if the post has an image with a brand logo and a positive sentiment. As another example, an automated request for permission may be triggered when the level of engagement on a post reaches a certain threshold, thereby filtering potential user-generated content based on other users' engagement and interest.

In one or more embodiments, an 'auto response' rule may perform initial filtering based on the conditions and generate a suggested response. Rather than automatically sending the permission request, it is first presented to a human user. The rule thereby allows a marketing specialist or some other SRM user to review and/or edit the permission request before it is posted.

Triggering Publishing Activities

In some cases, an auto-reply may be posted in response to a single message as a direct reply to that message. In addition or as an alternative, the auto-reply may trigger a broadcast or other publishing activity that is directed toward a target audience. For instance, if an automated response is triggering off an aggregate of messages, an automated message may be posted to a fan base, followers, a group of users in a peer-to-peer-style network, or another target audience in other style networks. An autoreply rule may specify the target audience and may vary the target audience based on one or more of the conditions described above.

Auto-publishing may be used in the context of marketing activity. As an example, a company that sells wedding dresses may have material ready to be published. A marketing specialist may set up an autoreply rule that gets triggered based on a celebrity wedding taking off on social media, which may be detected through social media listening. In some cases, the 'auto-publishing' may include an approval process whereby social listening triggers the dormant material, but the post is presented for manual approval before it is published. For instance, prior to triggering the action, an option may be displayed which, when selected by a single item of user input on a graphical user interface, triggers the responsive action. This allows companies to prepare material ahead-of-time and time the publishing of the content such that it coincides with a generated wave of interest in the topic.

In some cases, auto-publishing may be suspended based on an aggregate analysis. For instance, an aggregate analysis may indicate that people have been unhappy with a recent customer experience. Auto response rules based on this aggregated content may prevent triggering autoreply messages for users discussing anything related to that sensitive issue, instead adjusting the setting such that these messages are dealt with manually. In this case, aggregation of message data is fed back into the auto-response rule and used to adjust the conditions under which responsive actions are triggered.

Figure 4:
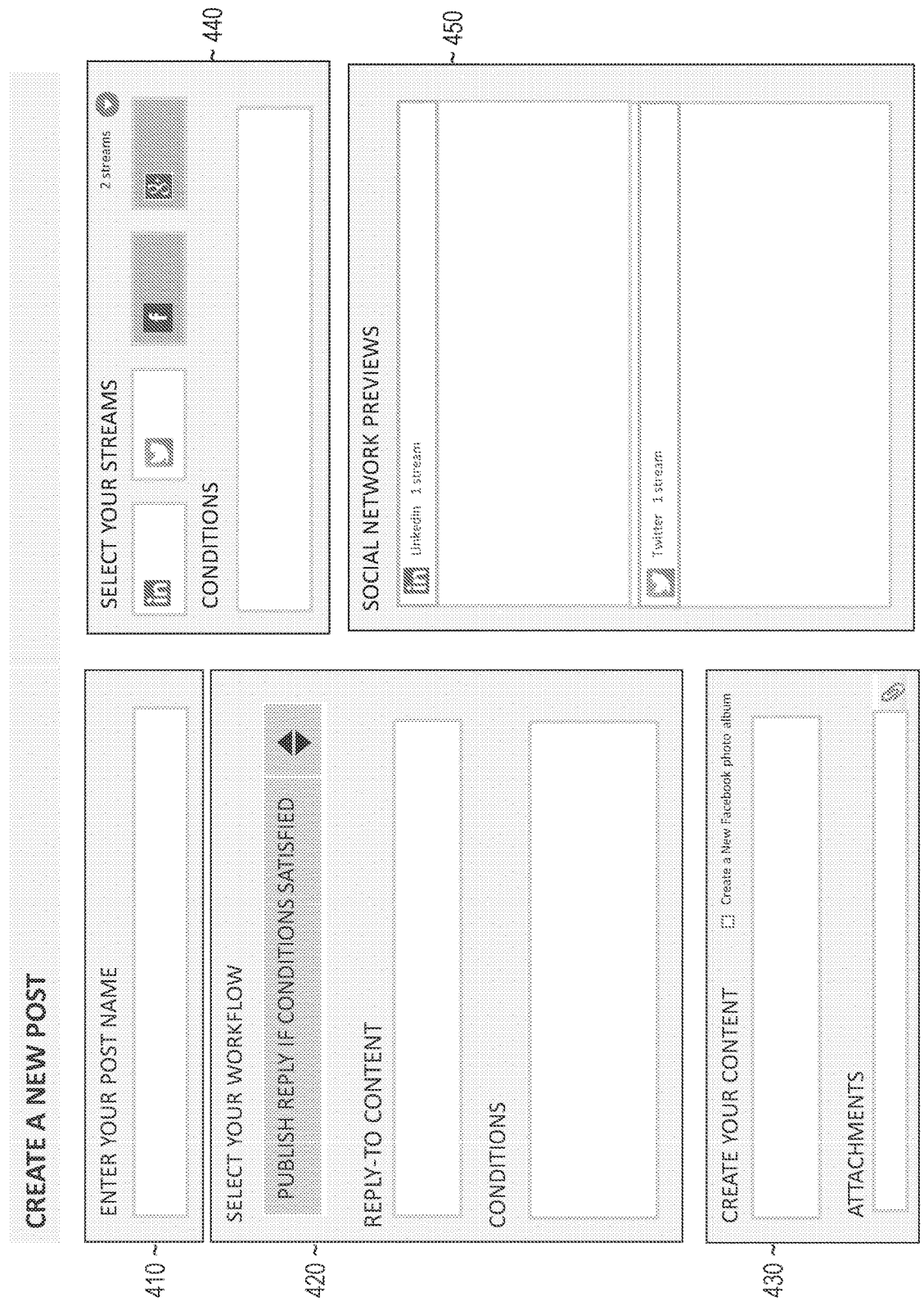
FIG. 4 depicts an example interface for specifying actions and conditions for an associated candidate post in accordance with one or more embodiments.

In one or more embodiments, SRM system 130 provides an interface through which SRM users may define candidate posts and the conditions that trigger actions with respect to the post. FIG. 4 depicts an example interface for specifying actions and conditions for an associated candidate post in accordance with one or more embodiments. The interface includes panel 410 allows an SRM user to specify a name for a candidate post. The interface further includes panel 420 to select a workflow for the candidate post. In the present example, the selected workflow triggers publication of the candidate post if the conditions are satisfied. The interface allows the user to specify reply-to content and the conditions under which to publish the candidate post if the reply-to content is detected. Other workflows may also be selected for other possible responsive actions (e.g., send notification if conditions satisfied, throttle marketing activity if conditions satisfied, etc.) The user may specify any of the conditions or recipes previously mentioned above. Panel 430 allows the user to create the content of the post. The user may enter text, images, videos, and/or attachments to create a candidate post. Panel 430 allows the user to explicitly select candidate channels on which to publish the candidate post and the condition (if any) for selecting the candidate channels. Panel 450 displays a preview of the candidate post on different candidate communication channels that have been selected.

Selecting Reply-To Posts

In some instances, an automated message may be drafted before and in anticipation of a reply to post. In other words, the automated message is not drafted in response to any particular post. Rather, the reply-to post is selected after the automated message has been drafted. The reply-to post may be selected based on one or more conditions described above or may be manually selected, depending on the particular implementation. An automated message may also be used for a single reply-to post or multiple reply-to posts.

An autoreply rule may specify logic for selecting the reply-to post, including whether the message may be used for a single reply-to post or multiple reply-to posts, restrictions on users eligible to receive automated responses, etc. As an example, an autoreply rule may specify REPLY_TO (CANDIDATE_POSTS("LIST_OF_TARGET ATTRIBUTES")) to select reply-to posts having a list of target attributes. The target attributes may include, but are not limited to, attributes associated with a native entity controlling a channel, attributes associated with the communications channels itself, and attributes associated with a particular communication detected within the communications channel.

As previously mentioned, reply-to posts may be selected based on attributes of a native entity that controls a communication channel over which the reply-to post is detected. As an example, an autoreply rule may specify that reply-to posts should be selected if and only if a user that controls the communication channel has a threshold level of engagement, has a threshold level of influence, is located at, or within a threshold distance of, a certain location, and/or has a positive sentiment about a certain keyword or topic. As another example, an organization may set up an automated "Happy Birthday" message on a communication channel (e.g., a social media page or twitter account) of for social media users (the "native entities" in this context) when the SRM system detects that it is a social media user's birthday (e.g., based on user profile information and/or posts from others on the social media channel wishing the user a happy birthday) and the user has a positive sentiment about the organization (e.g., using the sentiment-level metrics previously discussed). Any other user attributes or combination of user attributes may be used to define conditions under which reply-to posts are selected.

In one or more embodiments, reply-to posts may be selected based on communication channel conditions. For example, reply-to posts may be selected from communication channels where a higher level of engagement is detected. Thus, the SRM system may post on a message on an entity's twitter feed instead of another social media account controlled by the same native entity if it is detected that the twitter feed has a higher level of engagement. By selecting communications channels with a higher level of engagement, the automated messages may be more effective at reaching the target audience without creating negative sentiment from posting the same message across all of the channels controlled by the user.

In one or more embodiments, reply-to posts may be selected based on attributes associated with the candidate reply-to posts themselves. For example, SRM system may select reply-to posts that have a view count that is greater than a threshold, a sentiment that is greater than a threshold, and/or based on any other communication-specific metrics previously described. As another example, the risk of responding to a particular reply-to post may be analyzed as previously described (e.g., the SRM system may determine whether the reply-to post has a list of bad words or was authored by a controversial entity) to determine whether a reply-to post should be selected.

Proactive Automated Services

Responsive actions may be used to extend the services provided to consumers through communication channels 120. As an example, an automated response may be generated that links the user directly to an online map service indicating the location of the closest customer service center. As another example, a consumer request via social media channel 120 may trigger automated data to be periodically sent to the user.

In one or more embodiments, a social API may be exposed through which a user may trigger a desired service based on one or more of the above conditions. For instance, automated messages may be established such that they may be triggered by certain users via a hashtag. When in an airport, concert, or some other venue, for instance, a user may tweet #howlongistheline. Based on the hashtag and the location of the user, a company may respond with an up-to-date estimate on the length of the line. The response may also direct the user to another line if the wait time is shorter.

Automated responses may be used to provide quick response (QR) codes or other barcodes to social media users based on detected conditions. For instance, if a user tweets "I'm hungry", an automated social message may be triggered based on the location of the user with a QR code to a nearby restaurant. Similarly, other promotional material may be provided based on the target content as well as conditions under which the target content is posted.

Automated responses may also be used to aid customer service representatives. As an example, a script may be generated for a customer service representative based on the posting of a customer. The customer service representative may use the script to more efficiently address the customer's problems over the phone.

In some cases, automated response may be used to convert private threads to public replies. For instance, if a private thread indicates that a particular problem was resolved and the problem is widespread, then the automated response may make the thread publicly available to help others that encounter the same issue.

Automated responses may be set up to load balance private replies. For instance, if a series of messages are received asking which security line is shorter in an airport, the automated response may direct the social media users to alternate lines to more evenly balance the distribution of people among the different checkpoints.

Automated responses may be used to provide on-premise functionality. For instance, a social media user may tweet "#taxi" or "#shuttle" at a designated waiting location. In response, an automated message may be triggered to alert a taxi or shuttle driver.

Automated responses may be used to selectively filter public or private content. For instance, rules may be established to prevent replying to private messages with respect to a public issue and vice versa. As another example, a rule may be specified to monitor and prevent inconsistent replies on different private threads.

In one or more embodiments, a customer may register a social handle to receive social services from a company. For example, "switch pickup person to X" by @personZ may cause a customer account associated with @personZ to switch the pickup person to X, if "switch pickup person to X" is an exposed social API for the company. As another example "send money to @personZ" may trigger a financial transaction that tankers money to personZ. Similarly commands such as "switch delivery address", "order item," etc. may be exposed through a registered social handle.

Evaluating Response Quality

In one or more embodiments, analytic service 136 may be configured to evaluate the quality of autoreply and/or manual responses within social media channels 120. The manner in which the quality is evaluated may vary depending on the particular implementation. Example factors that may be considered may include, without limitation:
  The level of consumer engagement triggered by the response;
  Changes in consumer sentiment triggered by the response;
  The content of the response such as whether the response contains inappropriate words or images;
  The controversiality of the response; and/or
  A quantified risk factor associated with the response.

In one or more embodiments, analytic service 136 may evaluate the quality of manual responses in the aggregate to determine how effective a customer service representative is at addressing issues detected on social media channels 120. For example, an automated messaging rule may cause alerts to be sent to the customer service representative and/or the customer service representative's manager if it is detected that the quality of responses made by the customer service representative is less than a threshold. Another rule may trigger periodic evaluation reports to be sent where the evaluation reports indicate.

In one embodiment, the SRM system provides a dashboard for viewing the quality of manual replies and/or autoreplies that were posted by various SRM personnel manually and/or triggered by condition and action logic that was activated by SRM personnel. The dashboard may measure the amount of engagement or validations of customer accounts manual replies are getting versus autoreplies, and/or the dashboard may compare personnel members or teams of personnel members to each other in terms of engagement or validations of customer accounts. A validation of a customer account occurs when a customer account is linked to a social handle, for example, by the customer providing the social handle explicitly or implicitly by responding to a promotion.

Adjusting Marketing Activity

In one or more embodiments, automated messaging service may adjust the level of marketing activity based on one or more conditions described above. As an example, if a certain team loses a sporting event, marketing activity, such as spending on advertisements, marketing messages, the rate of autoreply may be throttled in the region associated with the losing team. On the other hand, these marketing activities may be increased in the region associated with the winning team.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
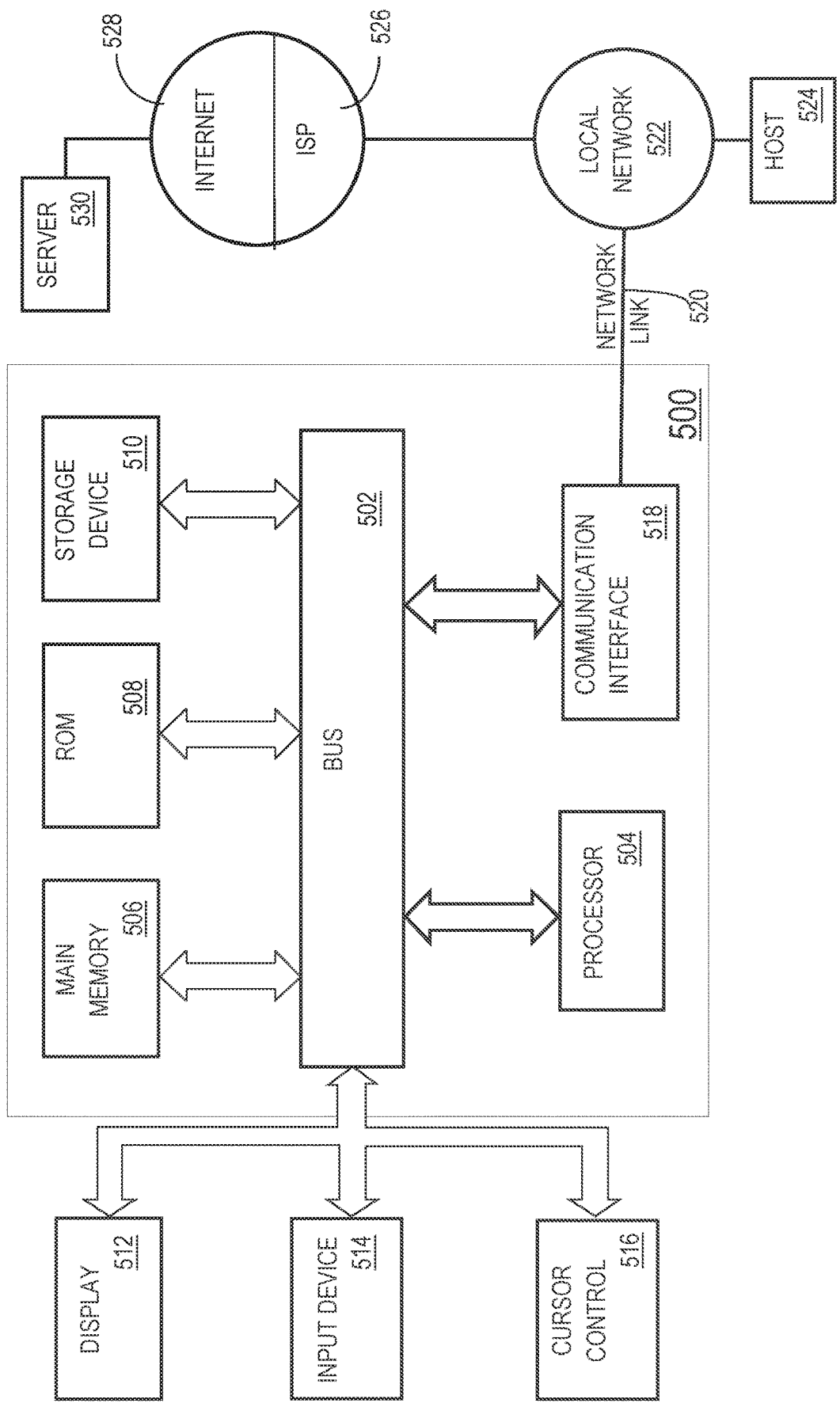
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions which, when executed by one or more hardware processors, cause:

receiving, through a user interface by a social media management system executing on one or more computing devices, user input that identifies a set of one or more conditions for triggering an automated action with respect to a candidate post on at least one social media channel, wherein at least one condition in the set of one or more conditions defines at least one threshold that a metric is relevant to at least one of the candidate post or a target of the candidate post;

monitoring, by the social media management system executing on one or more computing devices, one or more social media channels for target content that has been posted on at least one social media channel of the one or more social media channels;

in response to detecting, by the social media management system executing on one or more computing devices, that the target content has been posted on at least one social media channel of the one or more social media channels:

determining, by the social media management system, at least one probabilistic characteristic associated with the target content;

determining a relevance score for the at least one probabilistic characteristic as a function of at least (a) a probability that the probabilistic characteristic applies to at least one of the candidate post or the target of the candidate post, or (b) a confidence that the metric is accurate and (c) a temporal weight based on recency for which the probabilistic characteristic was measured;

determining, by the social media management system based on at least the relevance score for the at least one probabilistic characteristic, whether the set of one or more conditions are satisfied including whether the relevance score satisfies the at least one threshold that the metric is relevant to at least one of the candidate post or the target of the candidate post;

in response to determining that the set of one or more conditions are satisfied, triggering, by the social media management system, the automated action with respect to the candidate post on at least one social media channel responsive to the target content, wherein determining that the set of one or more conditions are satisfied includes determining that the relevance score satisfies the at least one threshold that the metric is relevant to at least one of the candidate post or the target of the candidate post.

2. The one or more non-transitory computer-readable media of claim 1, wherein triggering occurs without any intervening user interaction with the social media management system between the posting of the target content and the triggering of the automated action with respect to the candidate post on at least one social media channel responsive to the target content.

3. The one or more non-transitory computer-readable media of claim 1, the instructions further causing: prior to triggering the automated action with respect to the candidate post on at least one social media channel, displaying an option which, when selected by a single item of user input on a graphical user interface, triggers the automated action with respect to the candidate post on at least one social media channel.

4. The one or more non-transitory computer-readable media of claim 1, wherein the automated action with respect to the candidate post on at least one social media channel is triggered if and only if at least one positive condition is satisfied and prevented unless all negative conditions of a set of one or more negative conditions are satisfied.

5. The one or more non-transitory computer-readable media of claim 1, wherein the instructions further cause: storing, in a recipe object, the at least one condition and an action specification specifying the automated action.

6. The one or more non-transitory computer-readable media of claim 5, the instructions further causing:
causing display of summaries, wherein different summaries correspond to different recipes of a set of recipes;
wherein the set of recipes corresponds to a set of stored recipe objects; and
in response to selection of a particular recipe corresponding to the recipe object, retrieving, from the recipe object, the at least one condition and the action specification to activate the recipe.

7. The one or more non-transitory computer-readable media of claim 1, the instructions further causing:
displaying a tree structure that connects the at least one condition to an action specification specifying the action,
wherein the tree structure connects a plurality of boxes using directed edges, the plurality of boxes comprising a plurality of conditions and a plurality of action specifications.

8. The one or more non-transitory computer-readable media of claim 1, the instructions further causing:
displaying one or more templates comprising one or more condition templates, one or more action templates, or one or more recipe templates;
upon selection of a template of the one or more templates, automatically prompting, via a graphical user interface, for any one or more fields required by the selected template;
receiving the one or more fields via the graphical user interface; and
based on the received one or more fields, generating and storing at least one of an action specification or a condition.

9. The one or more non-transitory computer-readable media of claim 8, the instructions further causing:
displaying an option to drill into a labeled box representing a newly generated at least one of the action specification or the condition; and
in response to receiving a selection of the option via the graphical user interface, providing a textual representation of the at least one action specification or the condition;
wherein the textual representation is hidden from a view that represents the action specification as the labelled box.

10. The one or more non-transitory computer-readable of claim 1, wherein the probability that the automated action applied to the target is determined from group trends for entities that have at least one shared characteristic with the target.

11. The one or more non-transitory computer-readable of claim 10, wherein the at least one shared characteristic includes a shared geographic region of residence.

12. The one or more non-transitory computer-readable of claim 1, wherein the relevance score is further computed as a function of a channel weight associated with a communication channel for the one or more social media channels.

13. The one or more non-transitory computer-readable of claim 1, wherein determining that the set of one or more conditions are satisfied comprises determining that an uncertainty associated with a current location for a target satisfies a threshold value.

14. The one or more non-transitory computer-readable of claim 1, wherein the instructions further cause preventing at least one other action from triggering responsive to determining that another probabilistic characteristic does not satisfy at least one threshold.

15. A system comprising:
one or more hardware processors;
one or more non-transitory computer-readable media storing instructions which, when executed by the one or more hardware processors, cause:
receiving, through a user interface by a social media management system executing on one or more computing devices, user input that identifies a set of one or more conditions for triggering an automated action with respect to a candidate post on at least one social media channel, wherein at least one condition in the set of one or more conditions defines at least one threshold that a metric is relevant to at least one of the candidate post or a target of the candidate post;
monitoring, by the social media management system executing on one or more computing devices, one or more social media channels for target content that has been posted on at least one social media channel of the one or more social media channels;
in response to detecting, by the social media management system executing on one or more computing devices, that the target content has been posted on at least one social media channel of the one or more social media channels:
determining, by the social media management system, at least one probabilistic characteristic associated with the target content;
determining a relevance score for the at least one probabilistic characteristic as a function of at least (a) a probability that the probabilistic characteristic applies to at least one of the candidate post or the target of the candidate post, or (b) a confidence that the metric is accurate and (c) a temporal weight based on recency for which the probabilistic characteristic was measured;

determining, by the social media management system based on at least the relevance score for the at least one probabilistic characteristic, whether the set of one or more conditions are satisfied including whether the relevance score satisfies the at least one threshold that the metric is relevant to at least one of the candidate post or the target of the candidate post;

in response to determining that the set of one or more conditions are satisfied, triggering, by the social media management system, the automated action with respect to the candidate post on at least one social media channel responsive to the target content, wherein determining that the set of one or more conditions are satisfied includes determining that the relevance score satisfies the at least one threshold that the metric is relevant to at least one of the candidate post or the target of the candidate post.

16. A method comprising:

receiving, through a user interface by a social media management system executing on one or more computing devices, user input that identifies a set of one or more conditions for triggering an automated action with respect to a candidate post on at least one social media channel, wherein at least one condition in the set of one or more conditions defines at least one threshold that a metric is relevant to at least one of the candidate post or a target of the candidate post;

monitoring, by the social media management system executing on one or more computing devices, one or more social media channels for target content that has been posted on at least one social media channel of the one or more social media channels;

in response to detecting, by the social media management system executing on one or more computing devices, that the target content has been posted on at least one social media channel of the one or more social media channels:

determining, by the social media management system, at least one probabilistic characteristic associated with the target content;

determining a relevance score for the at least one probabilistic characteristic as a function of at least (a) a probability that the probabilistic characteristic applies to at least one of the candidate post or the target of the candidate post, or (b) a confidence that the metric is accurate and (c) a temporal weight based on recency for which the probabilistic characteristic was measured;

determining, by the social media management system based on at least the relevance score for the at least one probabilistic characteristic, whether the set of one or more conditions are satisfied including whether the relevance score satisfies the at least one threshold that the metric is relevant to at least one of the candidate post or the target of the candidate post;

in response to determining that the set of one or more conditions are satisfied, triggering, by the social media management system, the automated action with respect to the candidate post on at least one social media channel responsive to the target content, wherein determining that the set of one or more conditions are satisfied includes determining that the relevance score satisfies the at least one threshold that the metric is relevant to at least one of the candidate post or the target of the candidate post.

17. The method of claim 16, wherein triggering occurs without any intervening user interaction with the social media management system between the posting of the target content and the triggering of the automated action with respect to the candidate post on at least one social media channel responsive to the target content.

18. The method of claim 16, further comprising: prior to triggering the automated action with respect to the candidate post on at least one social media channel, displaying an option which, when selected by a single item of user input on a graphical user interface, triggers the automated action with respect to the candidate post on at least one social media channel.

19. The method of claim 16, wherein the automated action with respect to the candidate post on at least one social media channel is triggered if and only if at least one positive condition is satisfied and prevented unless all negative conditions of a set of one or more negative conditions are satisfied.

20. The method of claim 16, wherein the instructions further cause: storing, in a recipe object, the at least one condition and an action specification specifying the automated action.

* * * * *

UNITED STATES PATENT AND TRADEMARK OFFICE
CERTIFICATE OF CORRECTION

PATENT NO. : 10,972,411 B2
APPLICATION NO. : 16/588740
DATED : April 6, 2021
INVENTOR(S) : Ioannou et al.

Page 1 of 1

It is certified that error appears in the above-identified patent and that said Letters Patent is hereby corrected as shown below:

On the Title Page

On page 2, Column 2, item (56) under Other Publications, Line 12, delete "datasiff.eom/plafform/" and insert -- datasift.com/platform/ --, therefor.

On page 2, Column 2, item (56) under Other Publications, Line 15, delete "www.ibm.eom/" and insert -- www.ibm.com/ --, therefor.

In the Specification

In Column 10, Line 15, delete """>0.5""" and insert -- ">0.5"" --, therefor.

In Column 12, Line 28, after "212" insert -- . --.

In Column 13, Line 23, after "autoreply" insert -- . --.

In Column 14, Line 58, after "factors" insert -- . --.

In the Claims

In Column 38, Line 16, in Claim 10, after "computer-readable" insert -- media --.

In Column 38, Line 21, in Claim 11, after "computer-readable" insert -- media --.

In Column 38, Line 24, in Claim 12, after "computer-readable" insert -- media --.

In Column 38, Line 28, in Claim 13, after "computer-readable" insert -- media --.

In Column 38, Line 33, in Claim 14, after "computer-readable" insert -- media --.

Signed and Sealed this
Third Day of August, 2021

Drew Hirshfeld
*Performing the Functions and Duties of the*
*Under Secretary of Commerce for Intellectual Property and*
*Director of the United States Patent and Trademark Office*